(12) United States Patent
Shibata

(10) Patent No.: US 8,934,111 B2
(45) Date of Patent: Jan. 13, 2015

(54) IMAGE PROCESSING APPARATUS, METHOD FOR CONTROLLING IMAGE PROCESSING APPARATUS, AND STORAGE MEDIUM

(71) Applicant: Canon Kabushiki Kaisha, Tokyo (JP)

(72) Inventor: Daisuke Shibata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 13/718,958

(22) Filed: Dec. 18, 2012

(65) Prior Publication Data

US 2013/0155423 A1 Jun. 20, 2013

(30) Foreign Application Priority Data

Dec. 20, 2011 (JP) ................... 2011-278695
Dec. 20, 2011 (JP) ................... 2011-278696

(51) Int. Cl.
*G06F 3/12* (2006.01)
*H04N 1/387* (2006.01)
*H04N 1/00* (2006.01)
*H04N 1/393* (2006.01)
*G06F 3/0488* (2013.01)

(52) U.S. Cl.
CPC ........... *H04N 1/387* (2013.01); *H04N 1/00411* (2013.01); *H04N 1/0044* (2013.01); *H04N 1/00278* (2013.01); *H04N 1/3872* (2013.01); *H04N 1/3877* (2013.01); *H04N 1/393* (2013.01); *G06F 3/0488* (2013.01); *H04N 1/00413* (2013.01); *H04N 1/00482* (2013.01); *H04N 2201/0094* (2013.01); *H04N 2201/0091* (2013.01)
USPC ......... 358/1.13; 358/1.15; 358/1.2; 358/1.18; 715/274

(58) Field of Classification Search
CPC ... G06F 3/1208; G06F 3/1256; G06F 3/1207; G06F 3/1259; H04N 1/0044; H04N 1/2338; H04N 1/2392; H04N 1/2384
USPC ............. 358/1.18, 1.13, 1.15, 1.14, 1.2, 1.12, 358/1.9
See application file for complete search history.

(56) References Cited

U.S. PATENT DOCUMENTS

| 5,162,918 | A | * | 11/1992 | Muramatsu | .................. | 358/300 |
| 6,281,983 | B1 | * | 8/2001 | Takahashi et al. | ............. | 358/1.2 |
| 6,757,081 | B1 | * | 6/2004 | Fan et al. | ..................... | 358/474 |
| 2006/0232836 | A1 | * | 10/2006 | Yamada et al. | ............... | 358/527 |

(Continued)

FOREIGN PATENT DOCUMENTS

| JP | 09-93378 A | 4/1997 |
| JP | 11-105370 A | 4/1999 |
| JP | 2010-109597 A | 5/2010 |

*Primary Examiner* — Dennis Dicker
(74) *Attorney, Agent, or Firm* — Canon U.S.A., Inc., IP Division

(57) ABSTRACT

An image processing apparatus includes a reading unit configured to read a document to generate a document image, a display unit adapted to superimpose said document image on a sheet image indicating a sheet used for printing, so as to distinguishably display both an area where the document image is set to be printed and an area where the document image is not set to be printed, a receiving unit adapted to receive a drag operation by a user on the document image displayed by the display unit and a changing unit configured to change a print setting for printing the document image on the sheet based on the drag operation received by the receiving unit.

15 Claims, 30 Drawing Sheets

(56) References Cited

U.S. PATENT DOCUMENTS

| | | | |
|---|---|---|---|
| 2007/0064288 A1* | 3/2007 | Lee | 358/527 |
| 2007/0229926 A1* | 10/2007 | Morisaki et al. | 358/527 |
| 2010/0103435 A1* | 4/2010 | Namikata | 358/1.2 |
| 2010/0107065 A1* | 4/2010 | Shima et al. | 715/274 |
| 2011/0029859 A1* | 2/2011 | Igari | 715/234 |
| 2011/0199639 A1* | 8/2011 | Tani et al. | 358/1.15 |
| 2012/0182569 A1* | 7/2012 | Lee | 358/1.13 |

* cited by examiner

200 COPY SCREEN

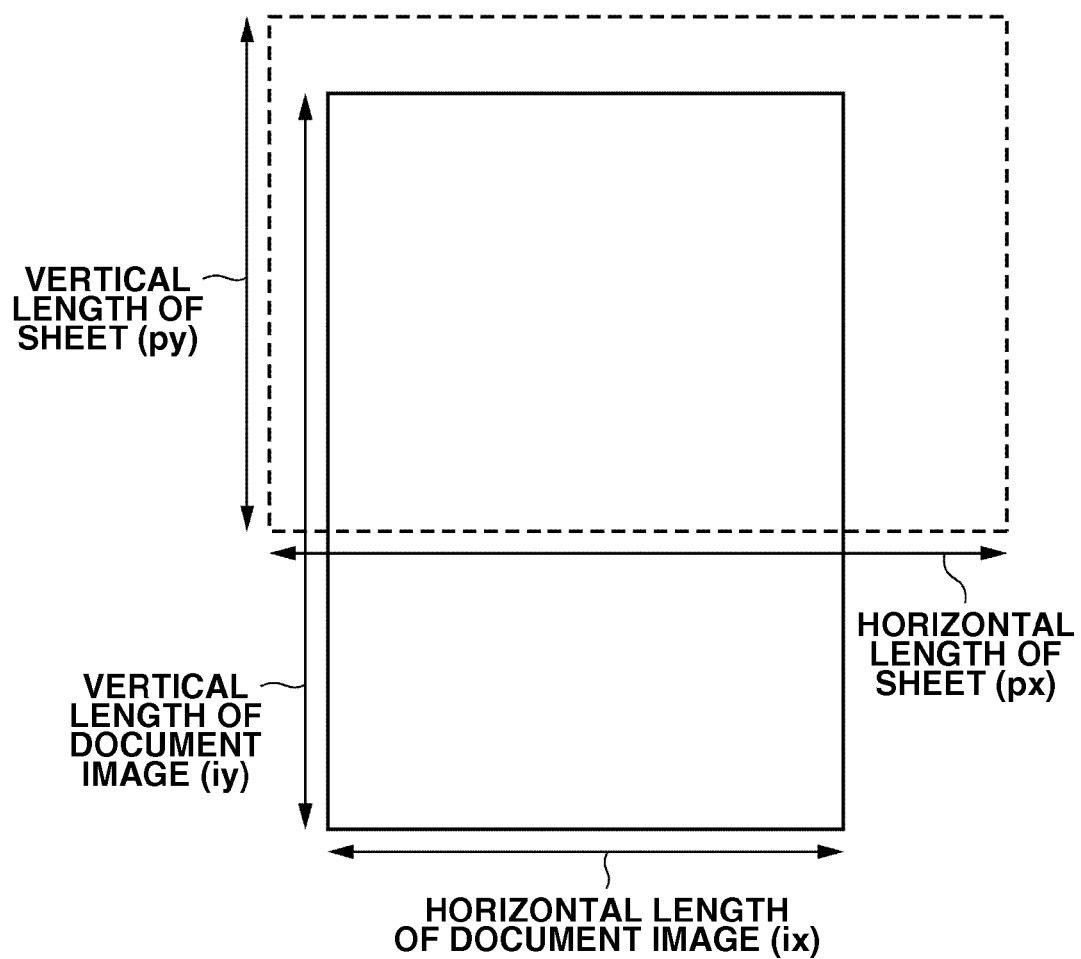

900 PREVIEW SCREEN

910 PREVIEW SCREEN

*1000* PREVIEW SCREEN

*1010* PREVIEW SCREEN

FIG.11
DOCUMENT IMAGE
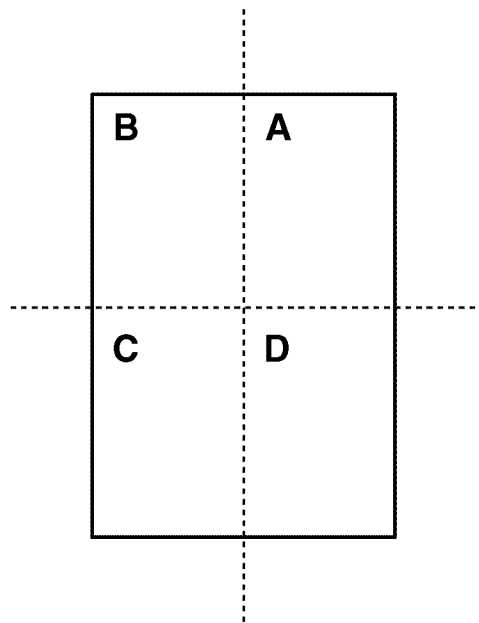
SHEET IMAGE
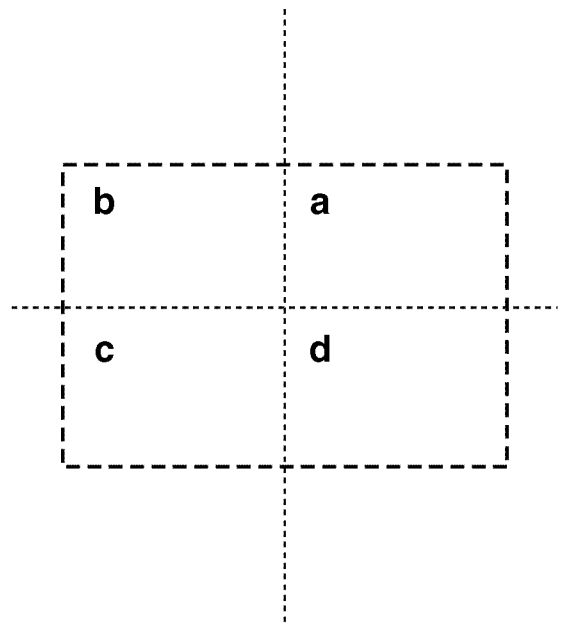

FIG.12

| START POINT | END POINT | | | |
|---|---|---|---|---|
| | a | b | c | d |
| A | — | 270°C SHIFT TO UPPER LEFT | 180°C SHIFT TO LOWER LEFT | 90°C SHIFT TO LOWER RIGHT |
| B | 90°C SHIFT TO UPPER RIGHT | — | 270°C SHIFT TO LOWER LEFT | 180°C SHIFT TO LOWER RIGHT |
| C | 180°C SHIFT TO UPPER RIGHT | 90°C SHIFT TO UPPER LEFT | — | 270°C SHIFT TO LOWER RIGHT |
| D | 270°C SHIFT TO UPPER RIGHT | 180°C SHIFT TO UPPER LEFT | 90°C SHIFT TO LOWER LEFT | — |

FIG.13A
FIG.13B
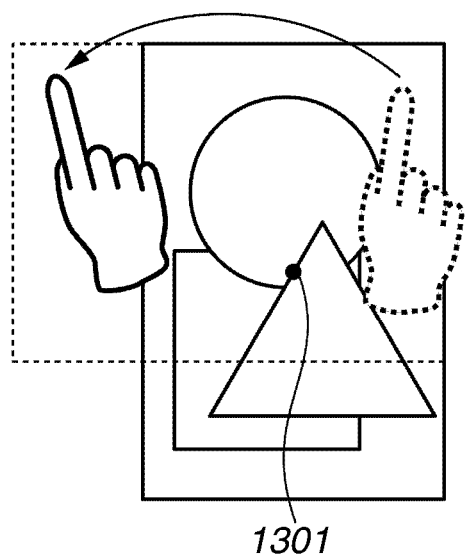
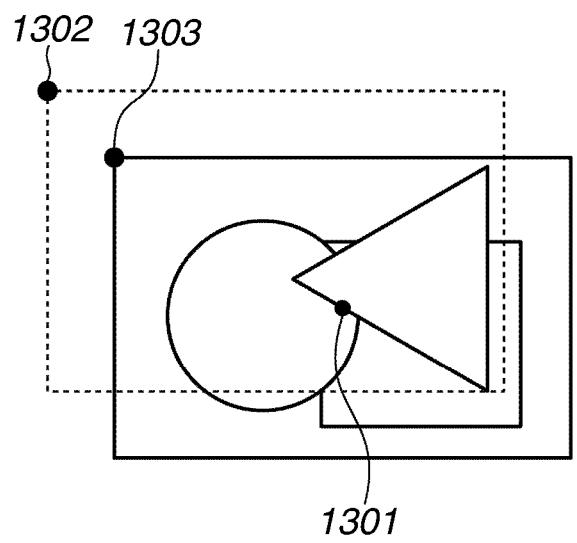

1500 PREVIEW SCREEN

1600 PREVIEW SCREEN

1610 PREVIEW SCREEN

1800 PREVIEW SCREEN

1810 PREVIEW SCREEN

2000 PREVIEW SCREEN

2010 PREVIEW SCREEN

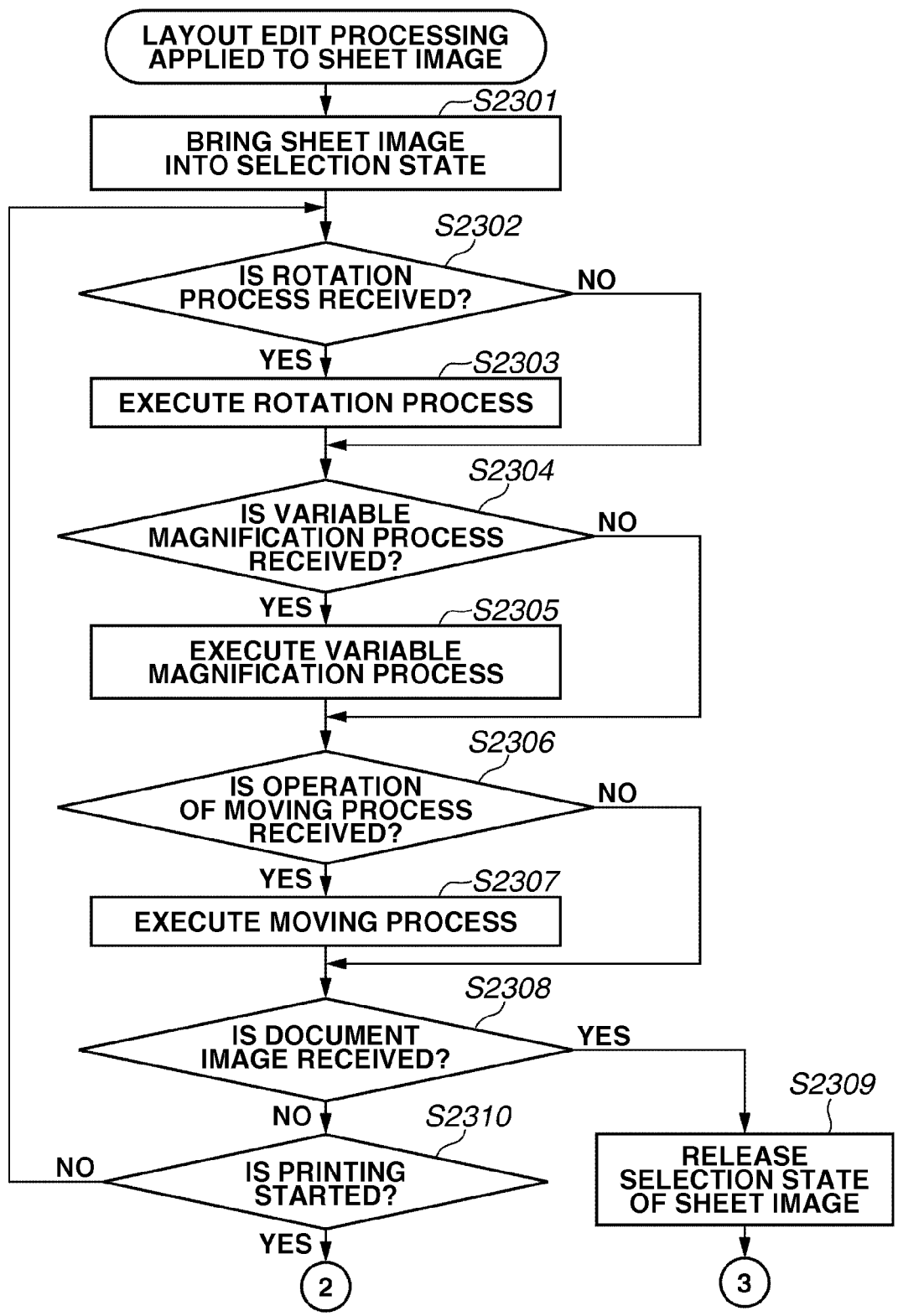

2400 PREVIEW SCREEN

2410 PREVIEW SCREEN

2420 PREVIEW SCREEN

2600 PREVIEW SCREEN

2700 PREVIEW SCREEN

2710 PREVIEW SCREEN

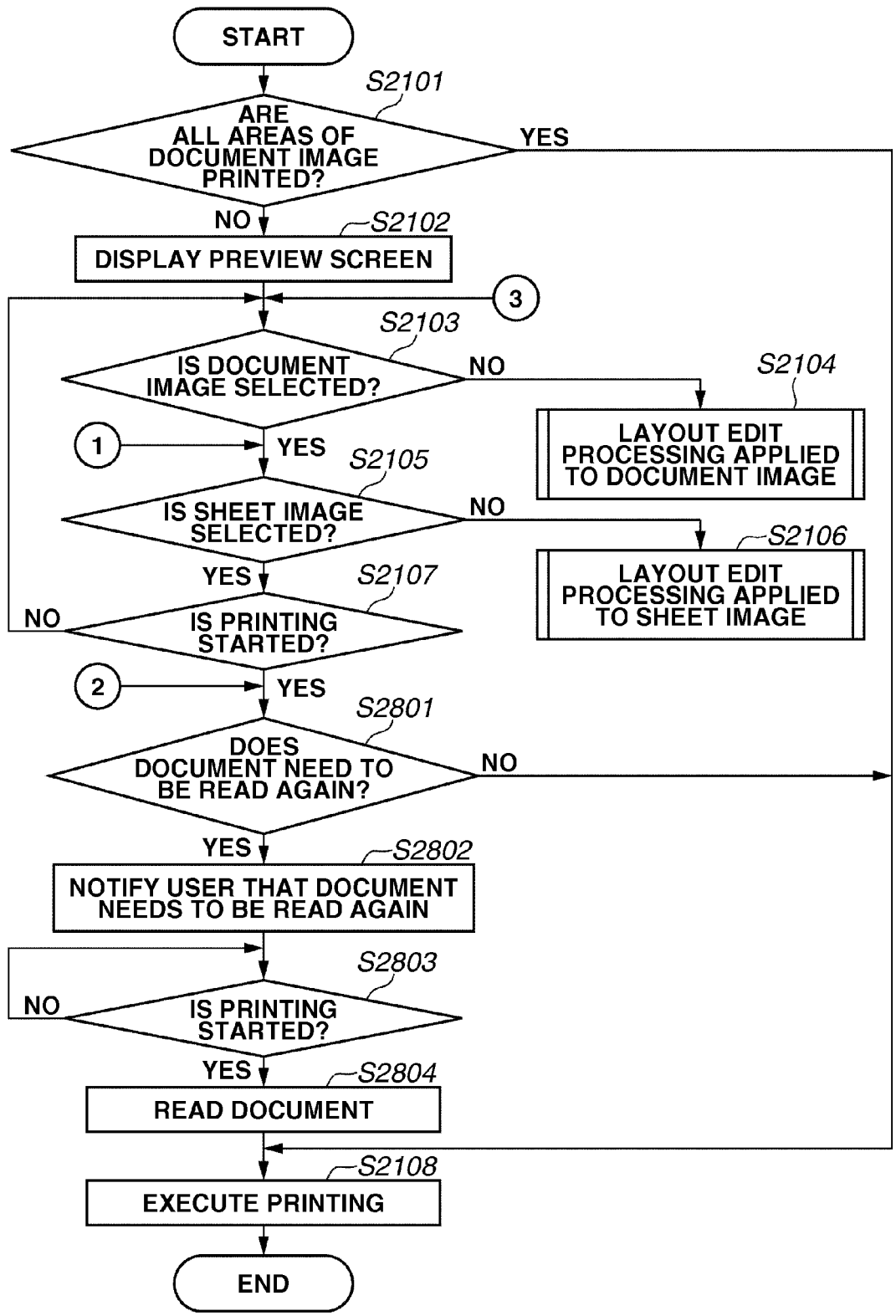

2900 RE-SCAN SCREEN

IMAGE PROCESSING APPARATUS, METHOD FOR CONTROLLING IMAGE PROCESSING APPARATUS, AND STORAGE MEDIUM

BACKGROUND OF THE INVENTION

1. Field of the Invention

The present invention relates to an image processing apparatus, a method for controlling the image processing apparatus, and a storage medium.

2. Description of the Related Art

An image processing apparatus such as a multi-function peripheral (MFP) has a copy function in which a scanner reads a document to generate image data and the image data is printed on a sheet. For the copy function, Japanese Patent Application Laid-Open No. 09-93378, for example, discusses a technique in which a print setting is received from a user at the time of executing copy and a print preview is displayed before the execution of copy.

In general, the image processing apparatus generates pseudo-halftone image data formed of N-bit dot patterns by screen processing and executes printing (refer to Japanese Patent Application Laid-Open No. 2010-109597, for example). Because the pseudo-halftone image data subjected to the screen processing are smaller in data content than multi-gradational image data, in general, in a case where copying is executed, the screen processing is executed when the scanner reads a document and the pseudo-halftone image data is generated.

When copying is executed by the image processing apparatus, a document image generated by reading the document can be enlarged and printed. Thereby, an A-4 size document, for example, can be enlarged and copied. However, if the document image is excessively enlarged, the document image becomes larger in size than the sheet, so that a total area of the document image may not be printed.

In this regard, Japanese Patent Application Laid-Open No. 11-105370 discusses a configuration for giving a user a warning if the size of data to be printed is larger than a printable area of the sheet.

Japanese Patent Application Laid-Open No. 11-105370, however, merely discusses the configuration for giving the user the warning. This causes a problem that the user cannot confirm which area is printed or not. The user needs to specify reduction and rotation processes to be applied to a document image as a print setting in order to print all areas of the document image. However, this produces a problem that a user unfamiliar with the operation of an image processing apparatus does not understand what print setting brings desired print results.

SUMMARY OF THE INVENTION

According to an aspect of the present invention, an image processing apparatus includes a reading unit configured to read a document to generate a document image, a display unit adapted to superimpose said document image on a sheet image indicating a sheet used for printing, so as to distinguishably display both an area where the document image is set to be printed and an area where the document image is not set to be printed, a receiving unit adapted to receive a drag operation by a user on the document image displayed by the display unit and a changing unit configured to change a print setting for printing the document image on the sheet based on the drag operation received by the receiving unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a chart comparing the document image with the sheet image according to the first exemplary embodiment.

FIG. 11 is a schematic diagram illustrating the rotation process according to the first exemplary embodiment.

FIG. 12 is a chart illustrating the rotation process according to the first exemplary embodiment.

FIGS. 13A and 13B are schematic diagrams illustrating the rotation process according to the first exemplary embodiment.

FIG. 23 is a flow chart indicating the layout edit processing applied to the sheet image according to the first exemplary embodiment.

FIG. 28 is a flow chart indicating the display of the preview screen and the layout edit processing according to the third exemplary embodiment.

DESCRIPTION OF THE EMBODIMENTS

Various exemplary embodiments, features, and aspects of the invention will be described in detail below with reference to the drawings.

The following exemplary embodiments do not limit the present invention according to claims and all of the combinations of characteristics according to the exemplary embodiments are not always essential for solving means of the present invention.

Figure 1:
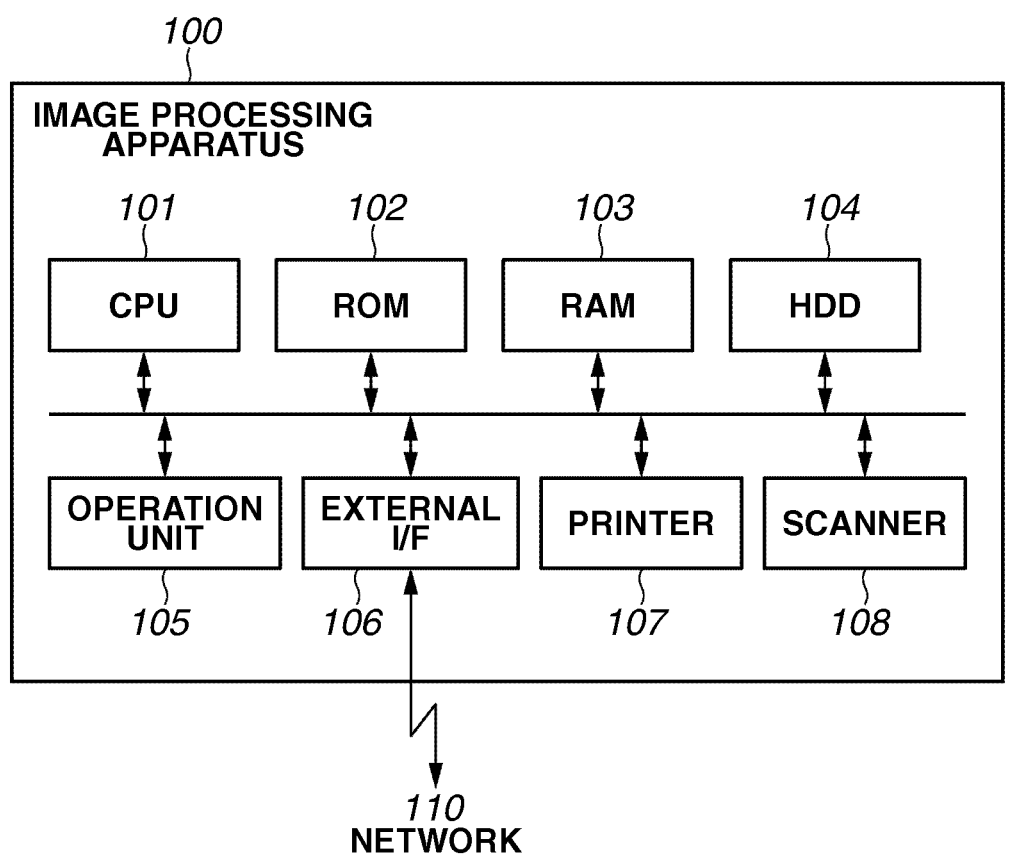
FIG. 1 is a block diagram illustrating a configuration of an image processing apparatus according to a first exemplary embodiment.

FIG. 1 is a block diagram illustrating a configuration of an image processing apparatus 100 according to a first exemplary embodiment. A multi-function peripheral (MFP) is cited as an example of an image processing apparatus, however, the image processing apparatus in the present exemplary embodiment is not limited to the MFP, but may be a single function peripheral (SFP) such as a printer.

A central processing unit (CPU) 101 reads control programs stored in a read only memory (ROM) 102 and a hard disk drive (HDD) 104 and controls the entire image processing apparatus 100. The ROM 102 stores information such as the control programs for executing processes related to flow charts described below, for example. A random access memory (RAM) 103 is used as a main memory of the CPU 101 and a temporary storage area such as a work area. As is the case with the ROM 102, the HDD 104 stores information such as the control programs, for example.

An operation unit 105 includes a display unit (a liquid crystal display having a touch panel function, for example) and a keyboard. The operation unit 105 displays various operation screens and notifies the CPU 101 of information input by the user via the operation unit 105.

A scanner 108 reads the document and generates image data (document image). A printer 107 executes a print processing to a sheet based on instructions input by the user via the operation unit 105 or commands input from an external apparatus via an external interface (I/F) 106.

The external I/F 106 communicates with an external personal computer (PC) and a server apparatus via a network 110.

Various operation screens displayed on the operation unit 105 are described below.

Figure 2:
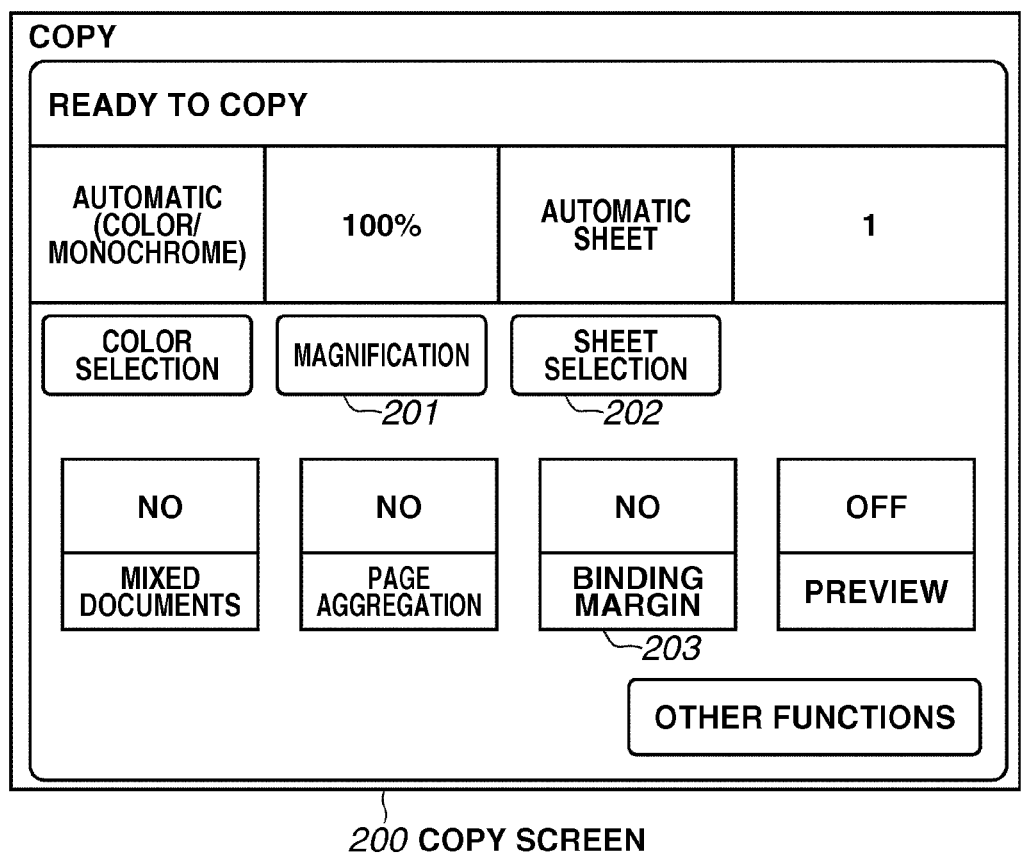
FIG. 2 illustrates a copy screen according to the first exemplary embodiment.

The user presses a copy button (not illustrated) to display a copy screen 200 illustrated in FIG. 2 on the operation unit 105. The user can perform copy setting related to copy on the copy screen 200.

As the copy setting, for example, a sheet on which the image data read by the scanner 108 are printed can be selected. If the user wants to select a sheet to be used for printing, the user selects (presses) a sheet selection button 202 by touch operation. The user selects the sheet selection button 202 to display a sheet selection screen 300 illustrated in FIG. 3 on the operation unit 105. The user selects a button 301 on the sheet selection screen 300 to set a sheet to be used for printing as "automatic." The term "automatic" refers to selecting a sheet with an appropriate size from a sheet cassette (not illustrated) based on the size of the image data to be printed. The user selects buttons 302 to 305 on the sheet selection screen 300 to select sheets whose sizes correspond to the buttons as sheets to be used for printing.

In addition to the above copy setting, for example, a desired print magnification can be set for printing the document image generated by the scanner 108 on a sheet with the document image enlarged or reduced. If the user wants to set the desired print magnification, the user selects a magnification button 201 of the copy screen 200. The user selects the magnification button 201 to display a magnification setting screen 400 illustrated in FIG. 4 on the operation unit 105. In the magnification setting screen 400, buttons 401 to 409 are used for setting magnification corresponding to sheet sizes. The user has only to select a desired button (desired print magnification) from among the buttons 401 to 409 based on the size of an original document and the size of a sheet to be used in printing. A button 410 is the one that sets equal magnification. The user can input any value to a button 411 via the operation unit 105 to set a desired magnification other than the magnifications indicated by the buttons 401 to 410.

Figure 5:
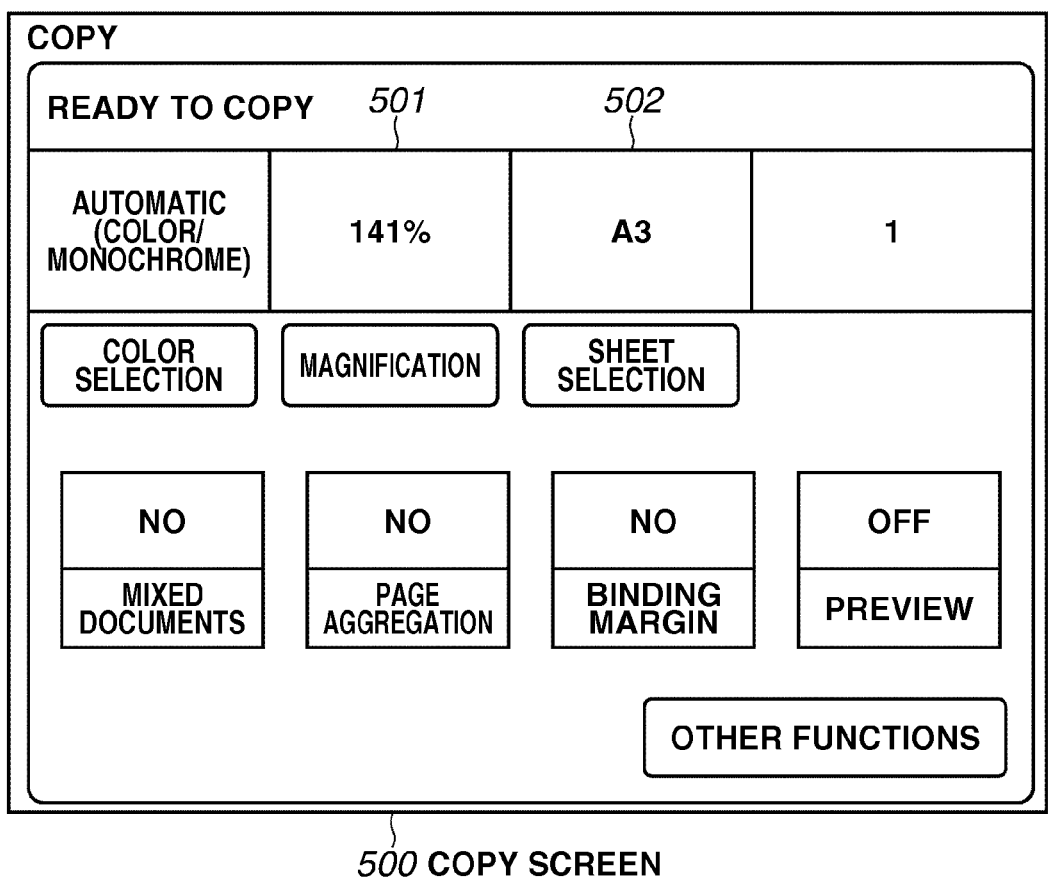
FIG. 5 illustrates a copy screen according to the first exemplary embodiment.

It is assumed that the user selects A3 as a sheet used for printing on the sheet selection screen 300 and 141% as a print magnification on the magnification setting screen 400. At this point, a copy screen 500 illustrated in FIG. 5 is displayed on the operation unit 105. The copy screen 500 is different from the copy screen 200, and 501 and 502 on the copy screen 500 are changed to the print setting set by the user. The selection of the sheet used for printing and the setting of print magnification are cited as an example of the print setting. In addition to the above, various types of settings such as mixed documents, page aggregation, and a binding margin can be made. If the user wants to set a binding margin, for example, a binding-margin button 203 is selected to display a binding-margin setting screen (not illustrated) on which the position and the size of the binding margin can be set.

There are described below specific examples of the cases where all areas of the document image generated by the scanner 108 are printed on the sheet and a part of the document image is not printed on the sheet.

Figure 6A:
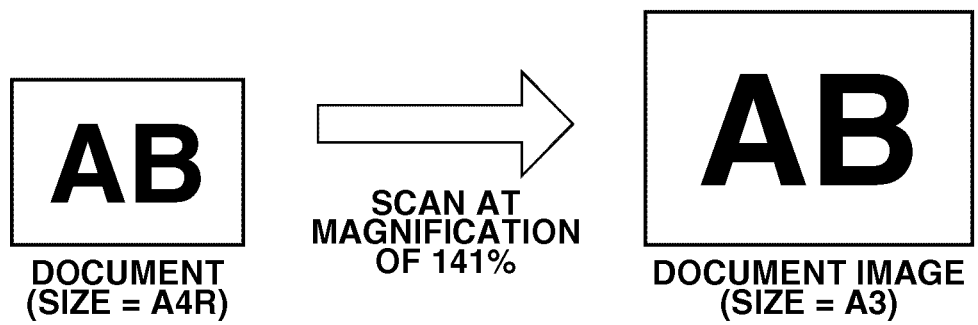
FIGS. 6A and 6B are charts comparing a document image with a sheet image according to the first exemplary embodiment.
Figure 6B:
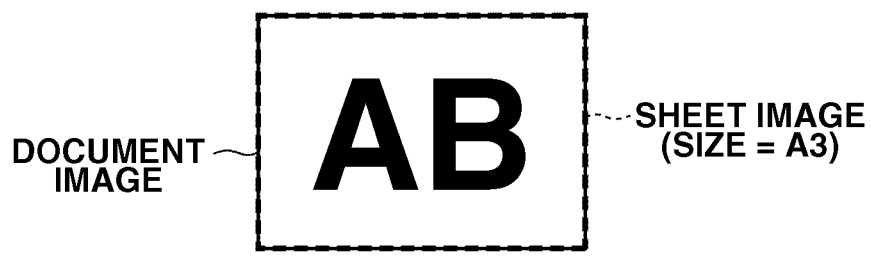

First, the case where all areas of the document image are printed is described below. It is assumed that the user places an A4R-size document on the scanner 108 and sets an A3-size sheet used for printing and a print magnification of 141% as the print setting. At this point, the scanner 108 reads the A4R-size document according to the user's instructions and generates the document image based on the print magnification set by the user. The size of the document image generated here is A3 illustrated in FIG. 6A. FIG. 6B is a chart comparing the size of the sheet image indicating the sheet used for printing with that of the document image generated by the scanner 108. In FIG. 6B, the sheet image is indicated by a broken line and the document image is indicated by a solid line. The sizes of the document image and the sheet image agree with each other, so that the document image is superimposed on the sheet image. In FIG. 6B, all areas of the document image are printed on the sheet.

Figure 7A:
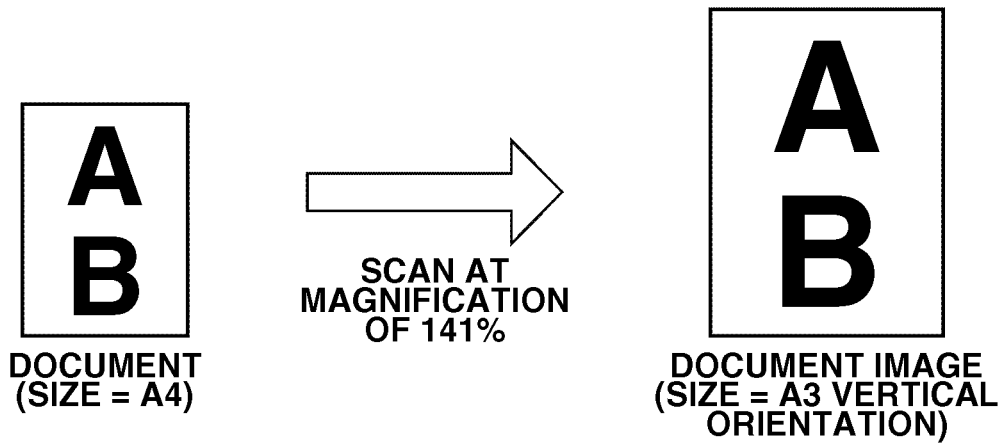
FIGS. 7A and 7B are charts comparing the document image with the sheet image according to the first exemplary embodiment.

The case where a part of the document image is not printed on the sheet is described below. It is assumed that the user places an A4-size document on the scanner 108 and sets A3-size as a sheet used for printing and a print magnification of 141% as the print setting. At this point, the scanner 108 reads the A4-size document according to the user's instructions and generates the document image based on the print magnification set by the user. The size of the document image generated here is A3 in vertical orientation as illustrated in FIG. 7A.

Figure 7B:
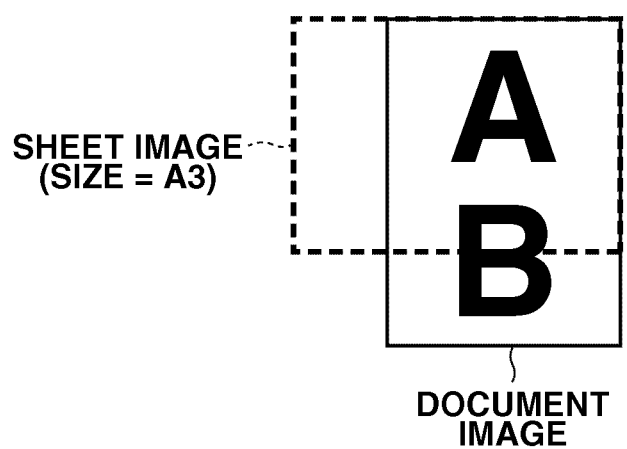

FIG. 7B is a chart comparing the size of the sheet image indicating the sheet used for printing with that of the document image generated by the scanner 108. In FIG. 7B, as is the case with FIG. 6B, the sheet image is indicated by a broken line and the document image is indicated by a solid line. Unlike FIG. 6B, the sizes of the document image and the sheet image do not agree with each other, so that a part of the area of the document image is not printed on the sheet image.

As illustrated in FIG. 7B, in a case where a part of the area of the document image is not printed on the sheet image, the present exemplary embodiment distinguishably displays which area of the document image is printed or not so that the user can recognize the respective areas. The following describes this display.

The user issues instructions for copy, which causes the CPU 101 to determine whether all areas of the document image are printed. The determination is described with reference to FIG. 8. FIG. 8 illustrates the document image and the sheet used for printing, and indicates a transverse length px and a longitudinal length py of the sheet used for printing and a transverse length ix and a longitudinal length iy of the document image. In FIG. 8, if px≥ix and py≥iy, the CPU 101 determines that all areas of the document image are printed. On the other hand, if px<ix and py<iy, the CPU 101 determines that a part of the area of the document image is not printed.

Figure 9A:
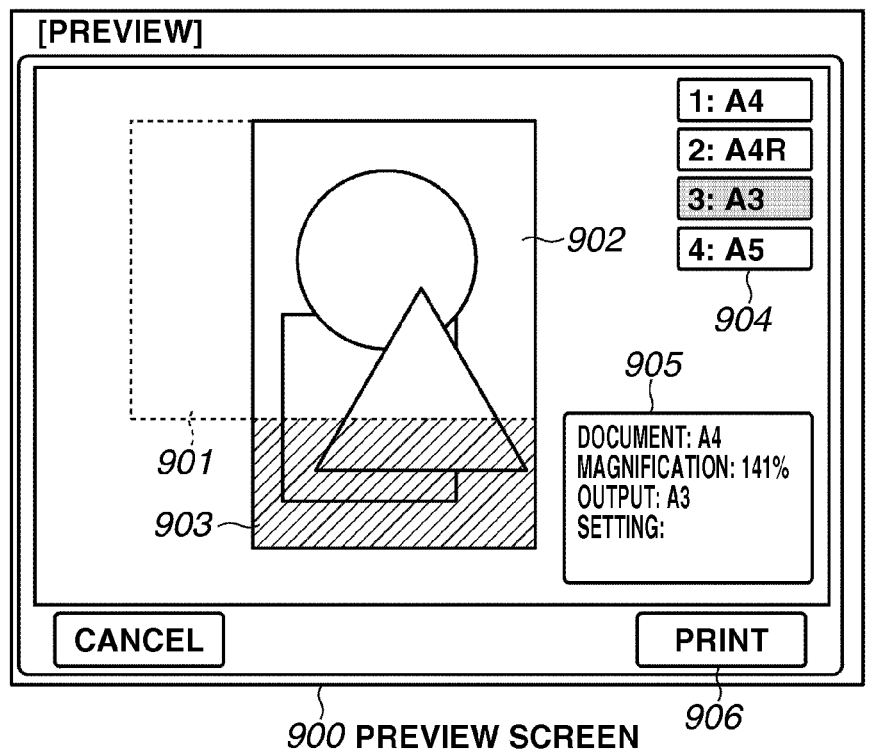
FIGS. 9A and 9B illustrate a preview screen according to the first exemplary embodiment.
Figure 9B:
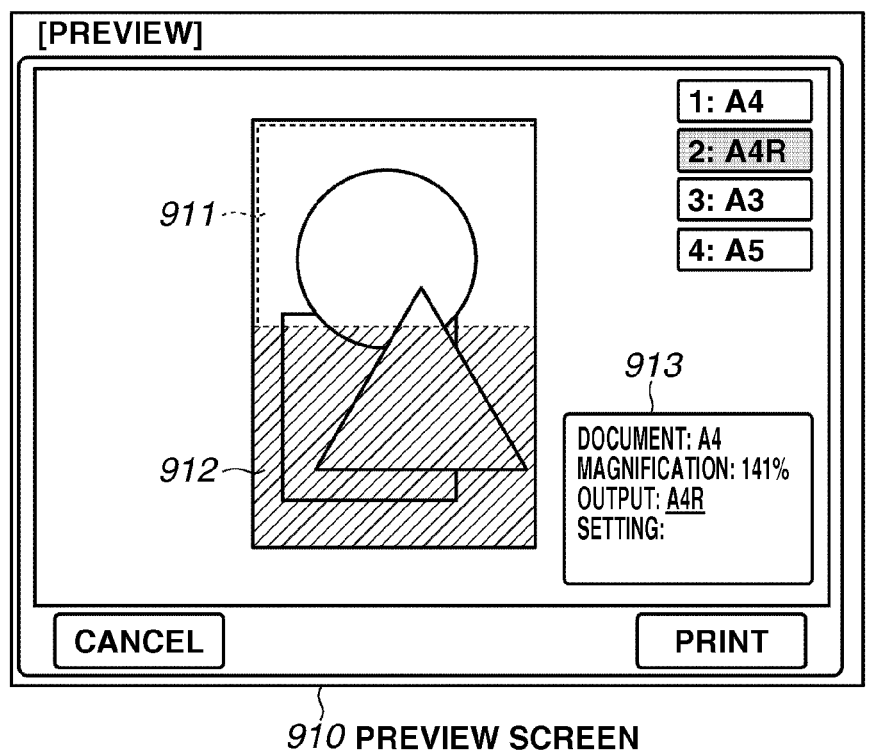

If the CPU 101 determines that all areas of the document image are printed, the CPU 101 executes printing based on the user's instructions without displaying a preview screen 900 described below in FIG. 9A. If the CPU 101 determines that a part of the area of the document image cannot be printed, the CPU 101 does not execute printing and displays on the operation unit 105 a screen to notify the user which area of the document image is printed or not. FIGS. 9A and 9B illustrate examples displayed on the operation unit 105.

The preview screen 900 in FIG. 9A is a screen, displayed on the operation unit 105, for notifying the user which area of the document image is printed or not. In the execution of copying, it is assumed that the user places the A4-size document on the scanner 108 and sets the A3-size sheet used for printing and a print magnification of 141% as the print setting.

A sheet image 901 indicates a sheet used for printing, i.e., an A3-size sheet. A document image 902 is an image generated by the scanner 108. In the present exemplary embodiment, both of the sheet image and the document image are displayed. Although the size of the document is A4, the size of the document image is A3 in vertical orientation because the print magnification is set to 141% on the preview screen 900. The sheet image 901 superimposed on the document image 902 is displayed on the preview screen 900 to distinguishably display which area of the document image is printed or not on the sheet.

An area 903 indicates an area where the document image 902 is not printed on the sheet. In the present exemplary embodiment, the area 903 is highlighted by shading, so that the user can recognize that the area 903 is the area where printing is not performed. A method for highlighting the area is not limited to shading, but other methods may be used, changing the color of a frame, for example. Because the sheet image 901 superimposed on the document image 902 is displayed to make it obvious that an area on which the sheet image 901 is not superimposed is an area where printing is not performed, the area 903 does not need to be highlighted.

Buttons 904 are used for changing a sheet used for printing. A button A3 is highlighted as the sheet used for printing, on the preview screen 900. By selecting any of the buttons 904, the user can change the sheet used for printing. The change of the sheet is described below with reference to FIG. 9B. When sheets are selected by the button 904, all sheets supported by the image processing apparatus 100 may be selected, or a desired sheet may be selected from the sheets stored in a sheet cassette (not illustrated). In the preview screen 900, an example is illustrated in which a sheet is selected from the sheets stored in four sheet cassettes provided in the image processing apparatus 100.

Print setting 905 is set on the sheet selection screen 300 and the magnification setting screen 400. "Document" in the print setting 905 indicates the size of the document read by the scanner 108, "magnification" indicates print magnification, and "output" indicates the size of the sheet used for printing. A button 906 instructs copying.

The change of the printing sheet using the button 904 is described below. It is assumed that the user changes the sheet used for printing from A3 to A4R on the preview screen 900. The screen displayed on the operation unit 105 is indicated on a preview screen 910 illustrated in FIG. 9B. A sheet image 911 indicates an A4R sheet already changed. An area 912 indicates the area where the document image is not printed on the sheet. Since the sheet used for printing is changed to A4R which is smaller than A3, the area 912 becomes larger than the area 903 on the preview screen 900.

A layout edit processing to which the document image is subjected is described below. It is assumed that a user intends to copy an enlarged A4-size document into an A3-size sheet and sets A3 as the sheet used for printing on the sheet selection screen 300 and 141% as a print magnification on the magnification setting screen 400. If the document is set in the orientation in which the A4-size is placed, as illustrated in FIG. 7B, a part of the area of the document image is not printed on the A3 sheet. To prevent this, if the user sets the document in the orientation of the A4R-size instead of A4, all areas of the document image can be printed.

However, a general user may not be able to know how to set the document to the scanner 108 to acquire a desired result when enlargement printing is performed. Then, the present exemplary embodiment is directed to editing the layout of the document image by an intuitive operation to provide the user a mechanism which enables the user to acquire the desired result, if a part of the area of the document image is not printed.

Figure 10A:
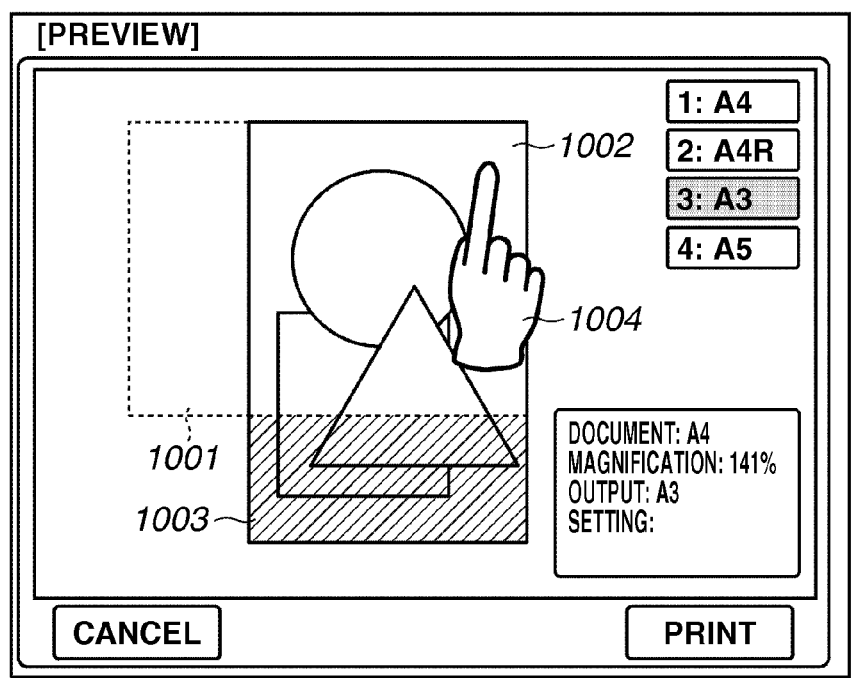
FIGS. 10A and 10B are schematic diagrams illustrating a rotation process according to the first exemplary embodiment.
Figure 10B:
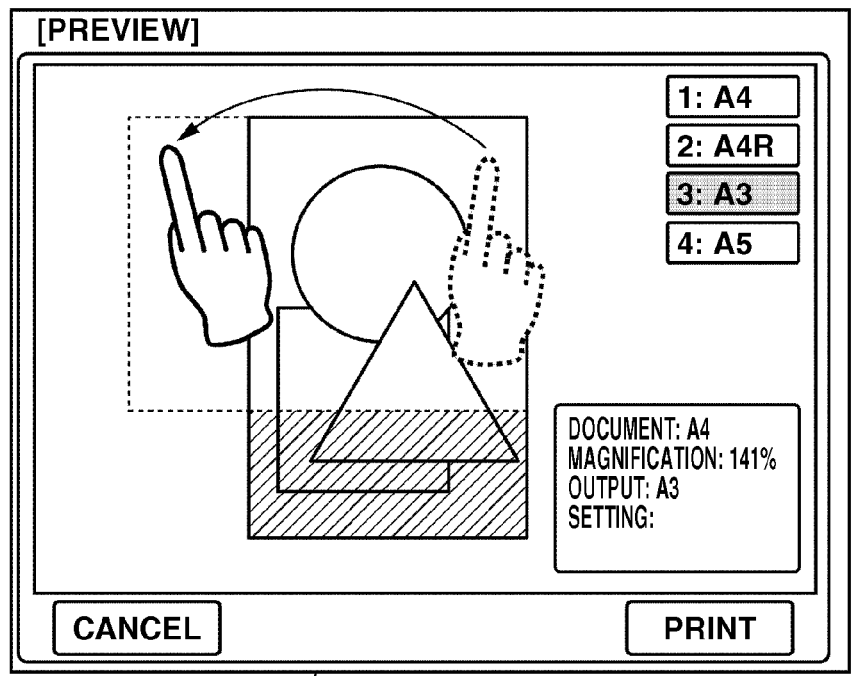

FIGS. 10A and 10B are schematic diagrams illustrating a layout edit processing in the present exemplary embodiment.

A preview screen 1000 illustrated in FIG. 10A is similar to the preview screen 900 and displayed on the operation unit 105. A sheet image 1001 and a document image 1002 are also illustrated in FIG. 10A. An area 1003 is the one where the document image is not printed on the sheet. In the present exemplary embodiment, the operation unit 105 is formed of a touch panel. The user can input various operations such as "touch," "drag," and "flick."

A hand 1004 indicates a state that the user touches the document image 1002. The user touching the document image 1002 brings the document image 1002 into a selected state and into a state where the layout edit processing can be received. When the document image 1002 is brought into the selected state, the document image 1002 is highlighted (the frame is thickened in the preview screen 1000).

In the present exemplary embodiment, the user rotates the document image 90° clockwise or counterclockwise to adjust the orientation of the document image to that of the sheet image, allowing all areas of the document image to be printed. Herein, a case where the user rotates the document image 90° counterclockwise is described below. In a case where the user rotates the document image 90° counterclockwise, as illustrated in a preview screen 1010 in FIG. 10B, the user inputs drag operation for rotating the touched document image. In the present exemplary embodiment, the CPU 101 of the image processing apparatus 100 detects the start and end points of the drag operation and executes rotation process described below based on the detected start and end points.

FIGS. 11 to 13 describe the rotation process.

In the present exemplary embodiment, as illustrated in FIG. 11, the document image and the sheet image are divided into four areas and it is detected where the drag operation for the document image starts in an area of the document image, and where the drag operation ends in an area of the sheet image. The drag operation is performed based on the detected area.

FIG. 12 is a chart which defines the rotation process executed by the CPU 101 for each of combinations of the start and end points of the drag operation. If definition is indicated by "-", the rotation process is not executed. In FIG. 12, a shift process for shifting the document image, such as "shift to upper left", and "shift to lower right" is also defined. The shift process is described blow with reference to FIGS. 13 and 14.

As illustrated in the preview screen 1010, if the user inputs the drag operation on the document image, the CPU 101 detects that the start point of the drag operation is in the area A and the end point is in the area b. According to FIG. 12, if the start point is in the area A and the end point is in the area b, the CPU 101 determines that an instruction for rotating the document image by 270° is input. The rotation angle in FIG. 12 indicates a clockwise rotation angle.

The shift process for shifting the document image is described below. FIG. 13A is a diagram drawn by withdrawing a part of the preview screen 1010. If the drag operation illustrated in FIG. 13A is input, the CPU executes the rotation process for rotating the document image by 270° according to FIG. 12. If the rotation process is executed around a center point 1301 of the document image, a layout acquired after the document image is rotated by 270° is indicated by FIG. 13B. In FIG. 13B, the area where the document image is not printed on the sheet still remains. It is time consuming for the user to further move the document image by the drag operation. The shift process in the present exemplary embodiment reduces a time-consuming work of the user.

If the drag operation illustrated in FIG. 13A is input, the CPU executes the rotation process for rotating the document image by 270° and shifts the document image to the upper left according to FIG. 12. "Shifting to the upper left" means that the document image is shifted so that the position of a vertex 1302 at the upper left of the sheet image agrees with the position of a vertex 1303 at the upper left of the rotated document image. The execution of the shift process displays the document image subjected to the rotation process as illustrated in FIG. 14, so that the user can eliminate the need for performing the time-consuming operation from FIG. 13 to FIG. 14.

Figure 14:
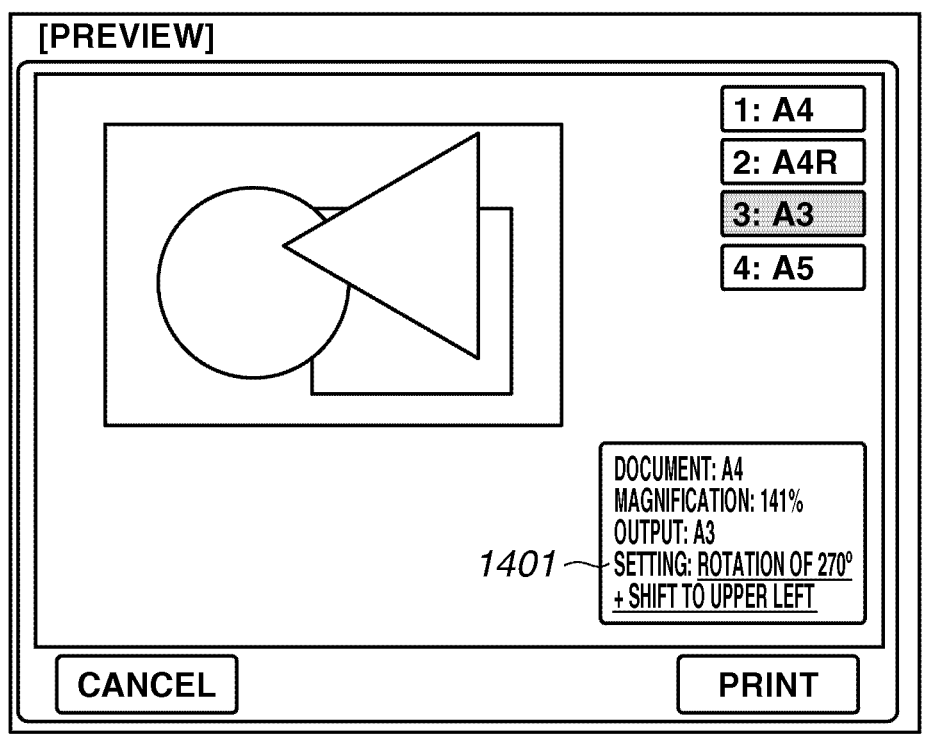
FIG. 14 is a schematic diagram illustrating the rotation process according to the first exemplary embodiment.

As illustrated in 1401 in FIG. 14, it can be seen that the print setting is changed to "rotation of 270°" and "shift to upper left" based on the drag operation. Thus, even if a user is unfamiliar with the operation of the image processing apparatus 100, the user can easily change the print setting by an intuitive operation to acquire the desired print results. If the user issues instructions for executing copying, copying is executed based on the print setting 1401 made after the print setting is changed and the print results are illustrated as layout in FIG. 14.

"Shifting to the lower left" in FIG. 12 means that the document image is shifted so that the position of the vertex at the lower left of the sheet image agrees with the position of the vertex at the lower left of the rotated document image. "Shifting to the lower right" means that the document image is shifted so that the position of the vertex at the lower right of the sheet image agrees with the position of the vertex at the lower right of the rotated document image. "Shifting to the upper right" means that the document image is shifted so that the position of the vertex at the upper right of the sheet image agrees with the position of the vertex at the upper right of the rotated document image.

Figure 15:
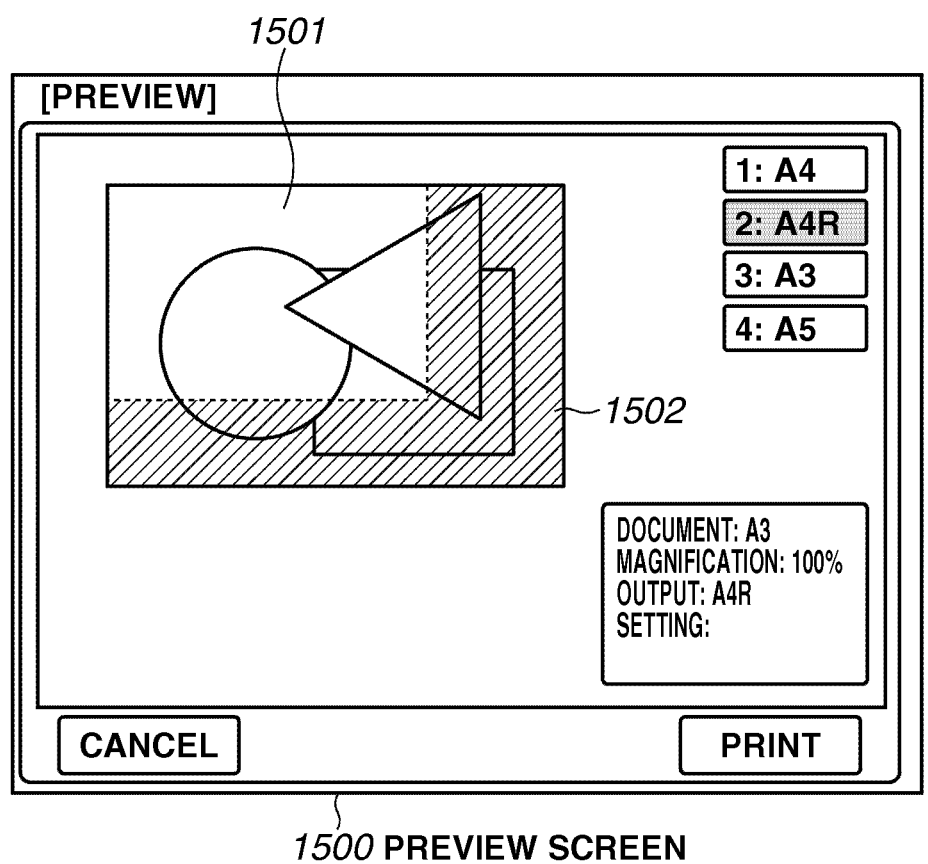
FIG. 15 is a schematic diagram illustrating a variable magnification process according to the first exemplary embodiment.

The variable magnification process of the document image is described below as the layout edit processing other than the rotation of the document image. A preview screen 1500 illustrated in FIG. 15 is the one that is displayed on the operation unit 105 when the user places an A3-size document on the scanner 108 and sets the A4R-size sheet for printing and a print magnification of 100% (same size) as the print setting. A sheet image 1501 is indicated by a broken line and a document image 1502 is indicated by a solid line. A shaded area is a part of the document image 1502 which is not printed on the sheet. At this point, the user reduces the document image to allow all areas of the document image to be printed on the sheet.

Figure 16A:
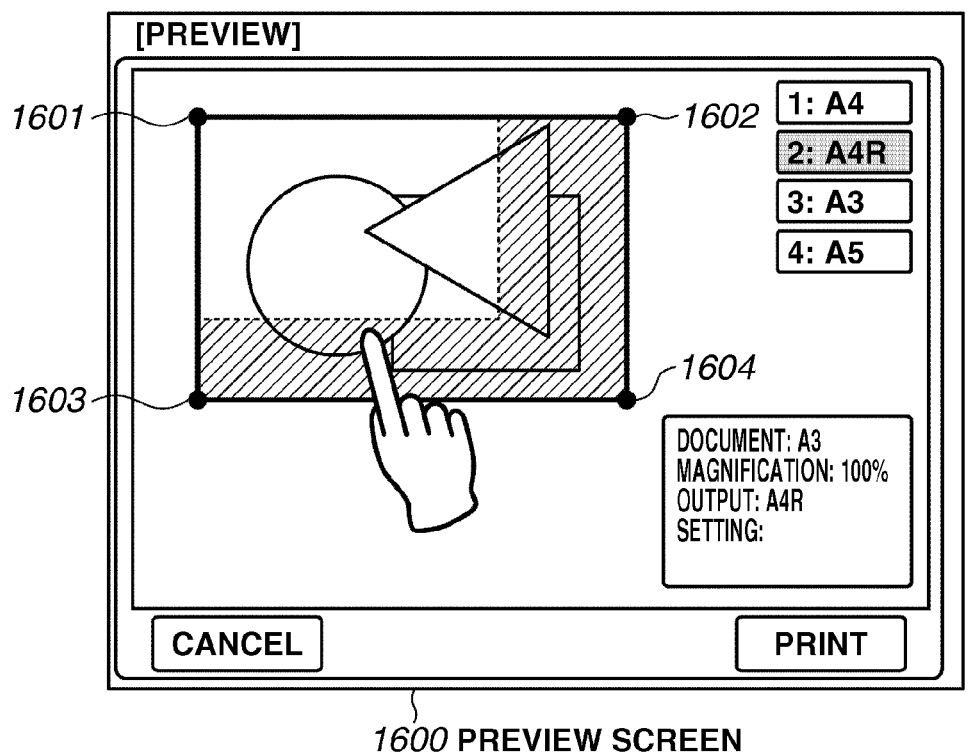
FIGS. 16A and 16B are schematic diagrams illustrating the variable magnification process according to the first exemplary embodiment.

The variable magnification process of the document image is described below with reference to FIG. 16. When the user touches the document image, the document image is highlighted, as illustrated in a preview screen 1600 in FIG. 16A, which is a state where the layout edit processing can be received. The CPU 101 of the image processing apparatus 100 switches between the rotation processing and the variable magnification process depending on which area the user operates when the document image receives the layout edit processing. More specifically, if vertexes 1601 to 1604 of the document image are operated by the user, the CPU 101 executes the variable magnification process.

Figure 16B:
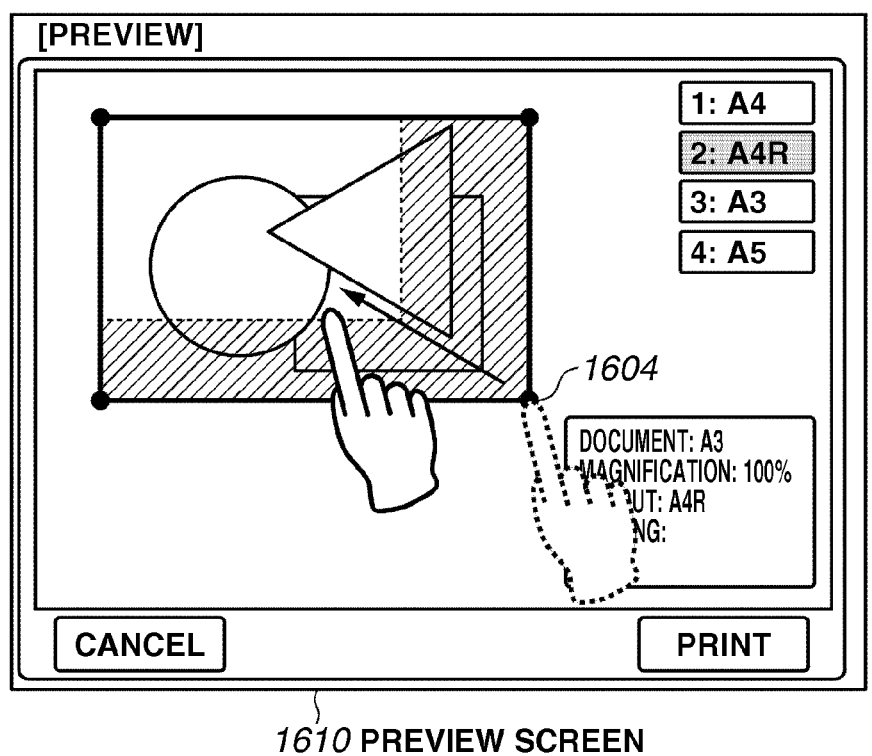

A preview screen 1610 illustrated in FIG. 16B describes a specific method of the variable magnification process. In the preview screen 1610, the user touches the vertex 1604 of the document image and drags the vertex 1604 along the diagonal line of the document image. The CPU 101 calculates "a variable magnification ratio=$(Z-L)/Z \times 100(\%)$," where Z is a length of the diagonal line of the document image and L is a movement distance by a drag operation along the diagonal line of the document image. In a case of reduction, $L>0$, so that the variable magnification ratio is smaller than 100%. In a case of enlargement, $L<0$, so that the variable magnification ratio is greater than 100%. The variable magnification process is applied to the document image based on the variable magnification ratio. After the variable magnification process is applied, the sheet image and the document image subjected to the variable magnification process are displayed on the operation unit 105.

Figure 17:
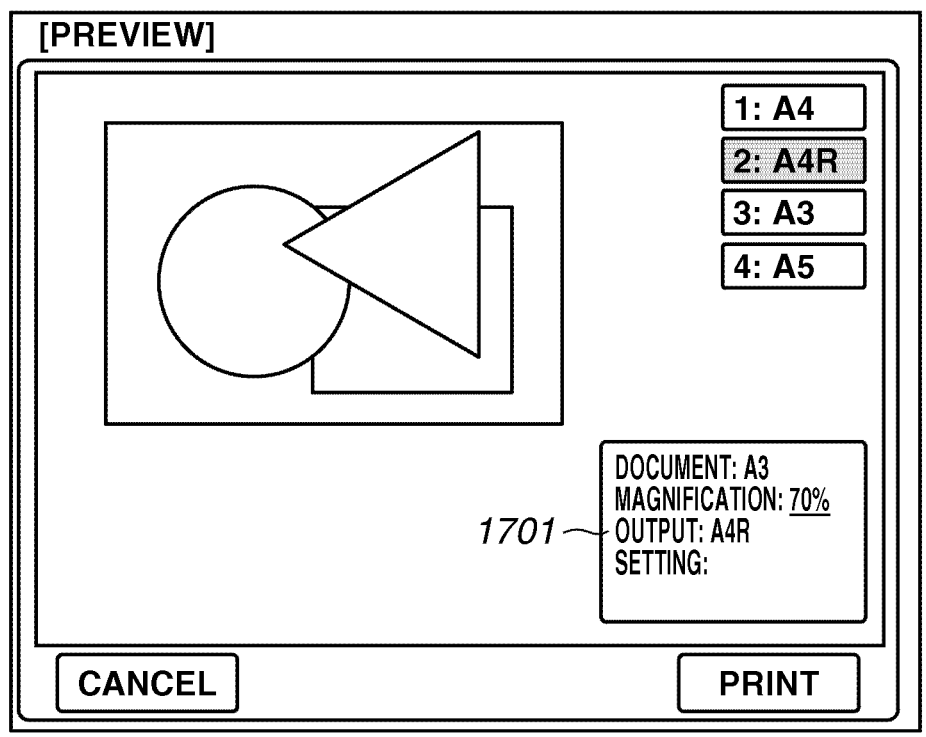
FIG. 17 is a schematic diagram illustrating the variable magnification process according to the first exemplary embodiment.

In the preview screen 1610, if a drag operation is performed so that the variable magnification ratio becomes equal to 70%, as illustrated in FIG. 17, the size of the sheet image agrees with that of the document image subjected to the variable magnification process after the variable magnification process is performed. In the present exemplary embodiment, if the variable magnification ratio calculated by the drag operation of the user is nearly 70% (65% to 75%, for example), the variable magnification ratio is considered as 70% and the variable magnification process is executed. As a result, the size of the sheet image agrees with that of the document image subjected to the variable magnification process without the user accurately performing the drag operation, so that user operability is improved. It can be seen from a print setting 1701 in FIG. 17 that magnification is changed to "70%" based on the drag operation of the user.

In the preview screen 1610, when the user drags the vertex 1604, the variable magnification process is executed with reference to the vertex 1601 at the upper left of the document image, in the present exemplary embodiment, however, even if other vertexes other than the vertex 1604 are dragged, the variable magnification process is executed with reference to the vertex 1601. In other words, in the present exemplary embodiment, the variable magnification process is executed with reference to the vertex of the document image which agrees in position with the vertex of the sheet image. If a plurality of vertexes agrees in position, the variable magnification process may be executed with reference to any vertex. In the present exemplary embodiment, if any vertex of the document image does not agree in position with the vertex of the sheet image, the variable magnification process is executed with reference to the vertex at the upper right of the document image.

Figure 18A:
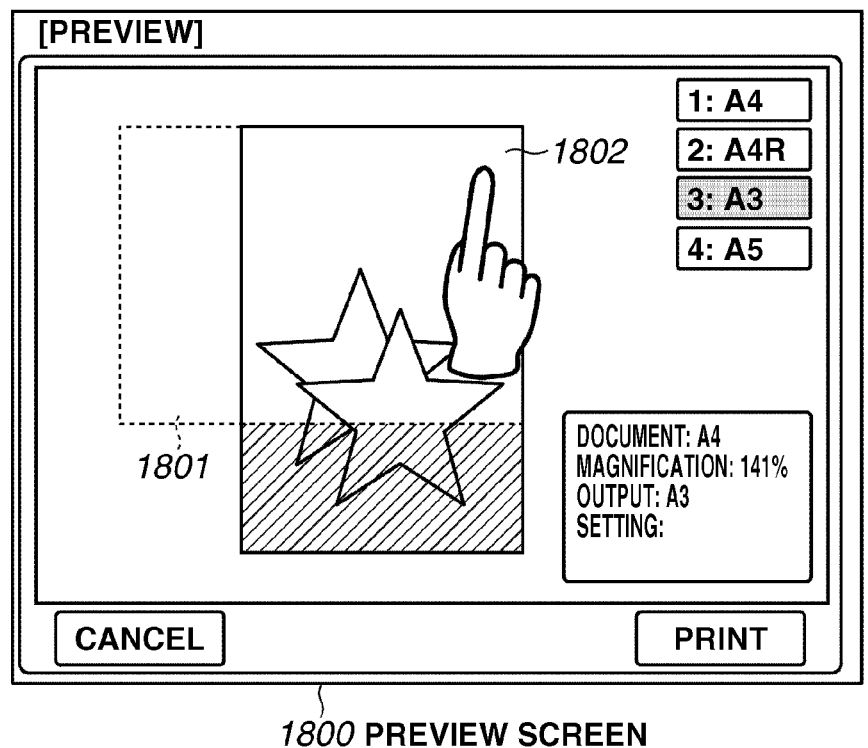
FIGS. 18A and 18B are schematic diagrams illustrating a moving process according to the first exemplary embodiment.

A moving process for moving the document image by the drag operation of the user is described below as another example of the layout edit processing of the document image. A preview screen 1800 illustrated in FIG. 18A is a screen displayed on the operation unit 105 if the user places the A4-size document on the scanner 108, sets the A3-size sheet for printing and a print magnification of 141% as the print setting, and issues instructions for printing. A sheet image 1801 is indicated by a broken line and a document image 1802 is indicated by a solid line. A shaded area is the one where the document image 1802 is not printed on the sheet.

The user touches the document image to execute the moving process. As illustrated in the preview screen 1800, the document image is highlighted and brought into a state where the layout edit processing can be received. In the present exemplary embodiment, the CPU 101 of the image processing apparatus 100 executes the moving process if the user performs the drag operation using two fingers, i.e., if the CPU 101 of the image processing apparatus 100 detects that two points are touched, to distinguish the moving process from the above rotation and the variable magnification process.

Figure 18B:
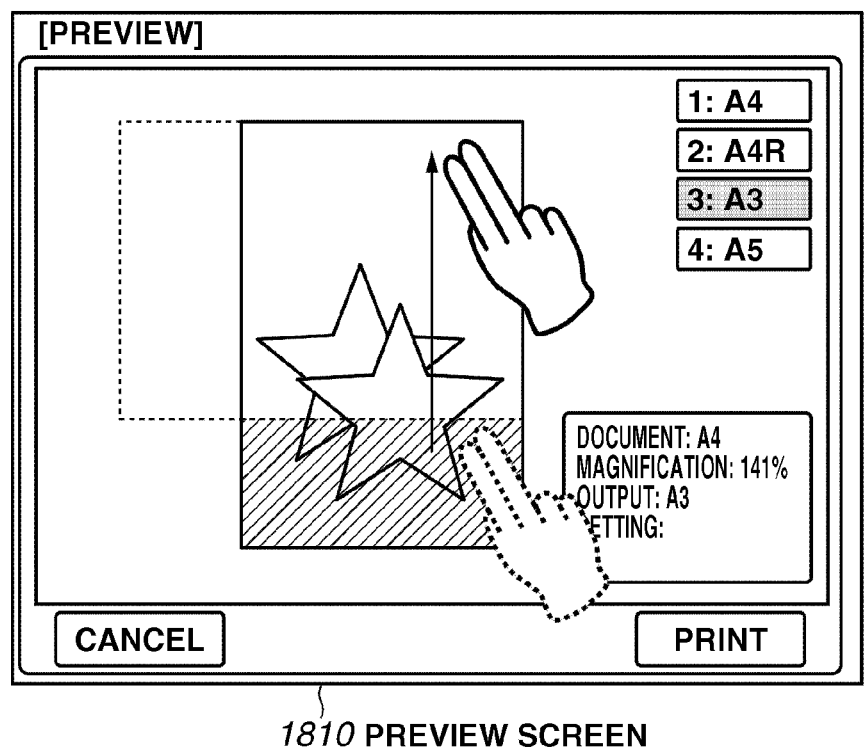
Figure 19:
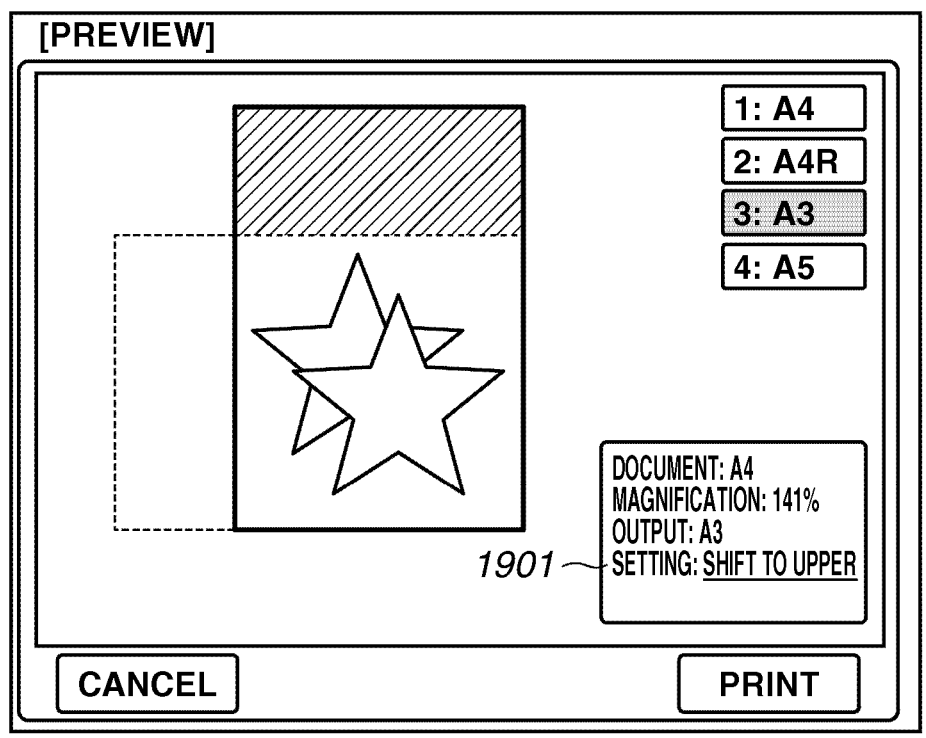
FIG. 19 is a schematic diagram illustrating the moving process according to the first exemplary embodiment.

As illustrated in a preview screen 1810 in FIG. 18B, it is assumed that the user performs the drag operation for moving the document image upward using two fingers. Then, as illustrated in FIG. 19, the document image is moved upward to change the position of the area where the document image 1802 is not printed on the sheet. Thereby, even if a part of the area of the document image is not printed on the sheet, the user can print a desired area on the sheet. It can be seen from a print setting 1901 in FIG. 19 that the print setting is changed to "Shift to upper" based on the drag operation of the user.

Although the example where the document image is moved upward is described in the present exemplary embodiment as the moving process, the user can move the document image in any direction.

In the above, the rotation process, the variable magnification process, and the moving process are described as the layout edit processing of the document image. The layout edit processing may be applied not only to the document image, but also to the sheet image.

Figure 20A:
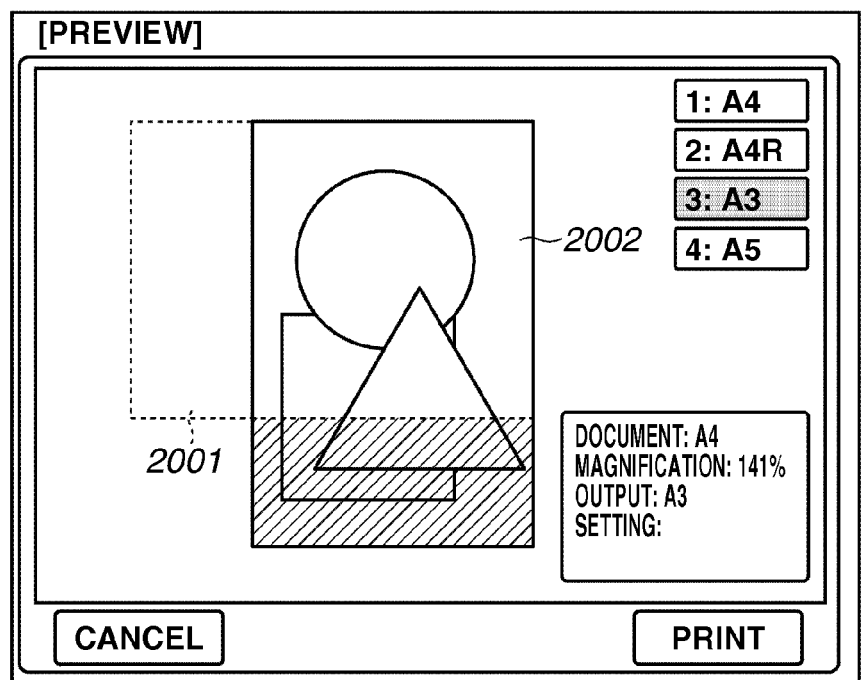
FIGS. 20A and 20B are schematic diagrams illustrating the layout edit processing applied to the sheet image according to the first exemplary embodiment.

A preview screen 2000 illustrated in FIG. 20A is a screen displayed on the operation unit 105 if the user places the A4-size document on the scanner 108 and sets the A3-size sheet for printing and a print magnification of 141% as the print setting. A sheet image 2001 and a document image 2002 are illustrated in FIG. 20A. In the above description, the user touches the document image to subject the document image to the layout edit processing. On the other hand, the user touches the sheet image if the user wants to subject the sheet image to the layout edit processing.

Figure 20B:
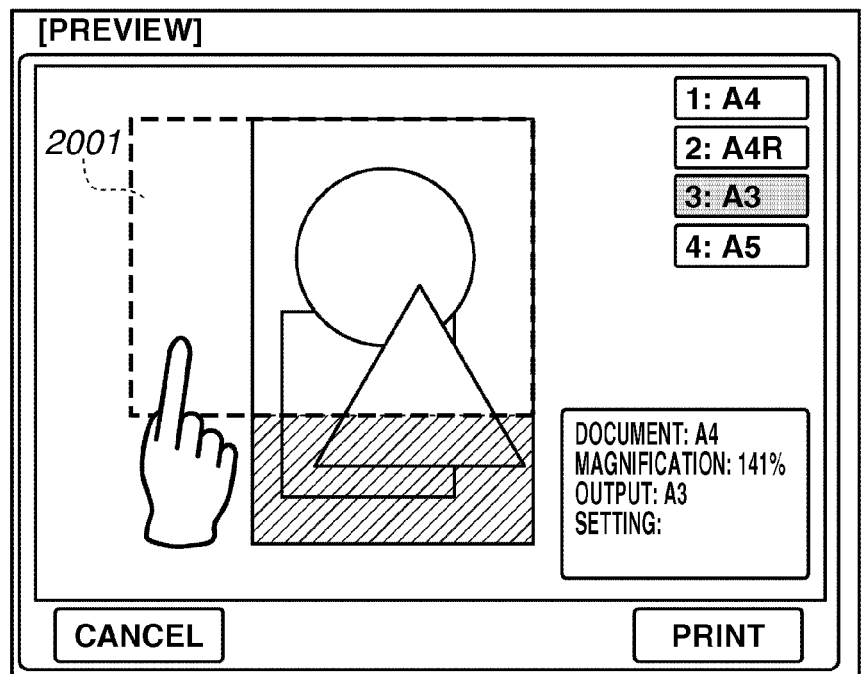

When the user touches the sheet image 2001 in the preview screen 2000, the sheet image is highlighted, as illustrated in a preview screen 2010 in FIG. 20B, which is a state where the layout edit processing can be received. If the user touches the area where the document image is superimposed on the sheet image, in the present exemplary embodiment, the document image is regarded as being touched. The layout edit processing applied to the sheet image is similar to the above rotation process, the variable magnification process, and the moving process applied to the document image, so that the description thereof is omitted. If the size of the sheet used for printing is changed by the layout edit processing applied to the sheet image, printing is executed using the sheet whose size is changed.

Figure 21:
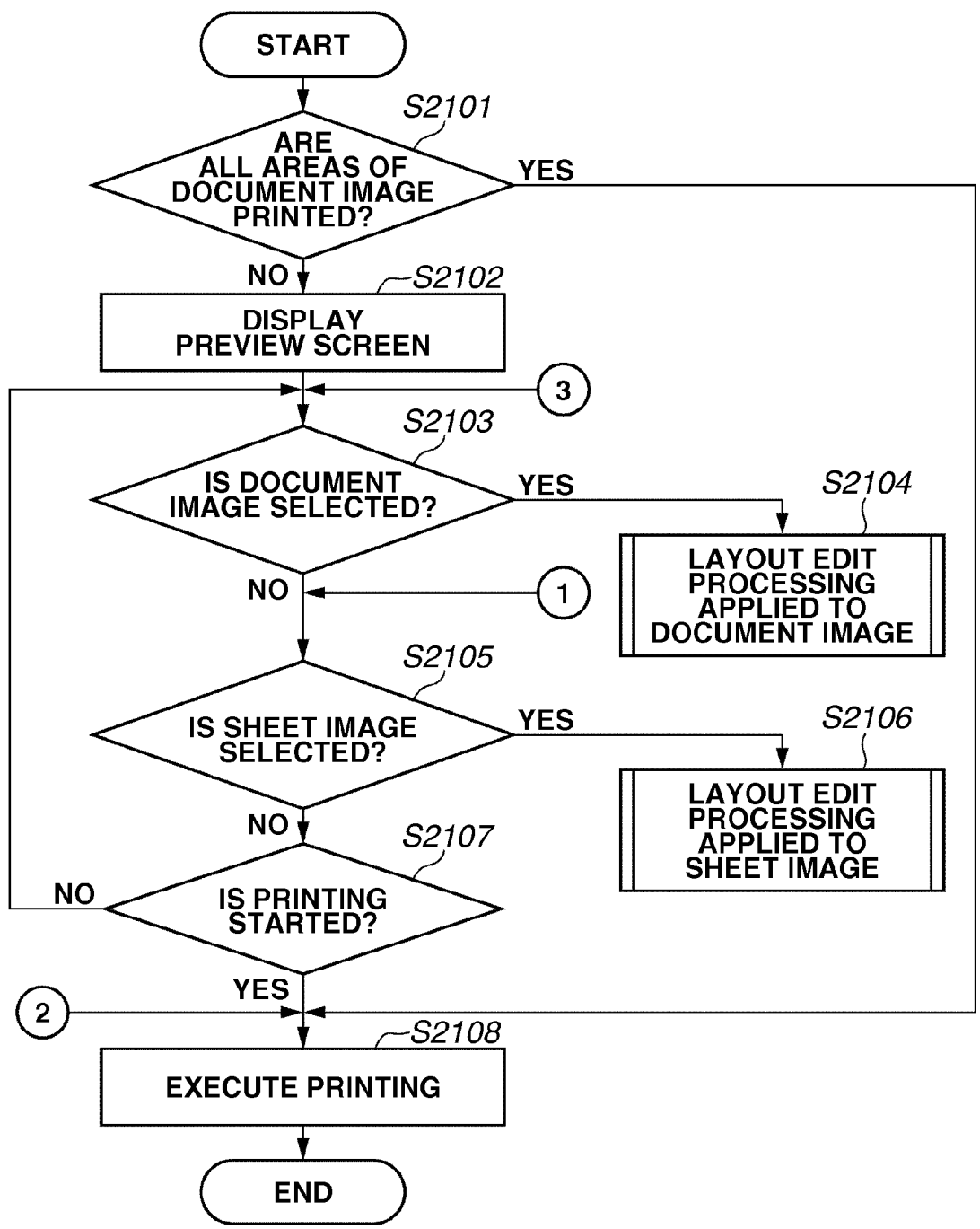
FIG. 21 is a flow chart indicating the display of the preview screen and the layout edit processing according to the first exemplary embodiment.

The display of the preview screen and the layout edit processing in the present exemplary embodiment are described below with reference to a flow chart of FIG. 21. Steps S2101 to S2108 illustrated in FIG. 21 are processed such that the CPU 101 of the image processing apparatus 100 develops programs stored in a memory such as the ROM 102 in the RAM 103 and executes the programs.

Figure 3:
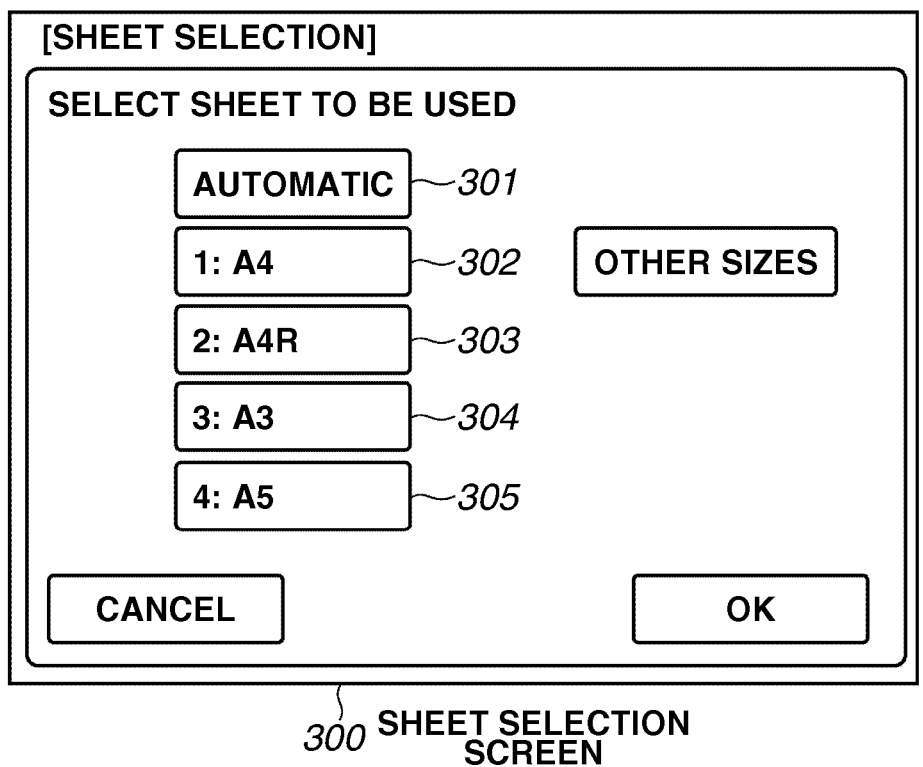
FIG. 3 illustrates a sheet selection screen according to the first exemplary embodiment.
Figure 4:
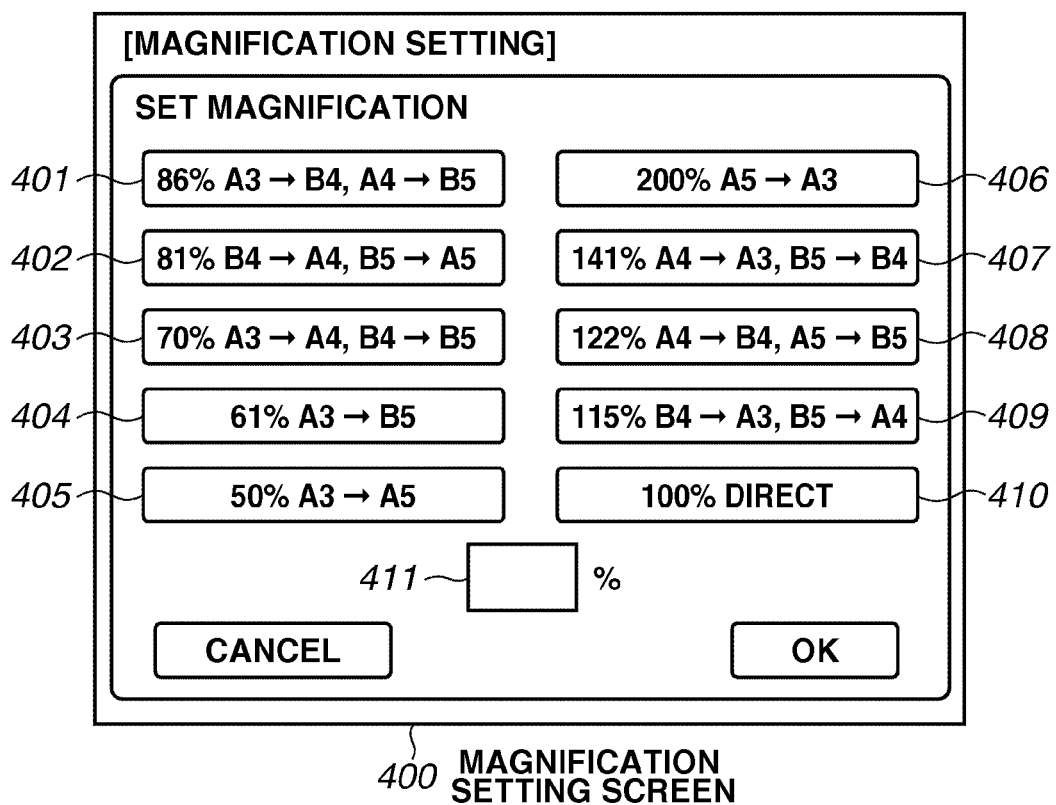
FIG. 4 illustrates a magnification setting screen according to the first exemplary embodiment.

It is assumed that the user performs a desired print setting using the sheet selection screen 300 in FIG. 3 and the magnification setting screen 400 in FIG. 4 and instructs the execution of copying using an execution button (not illustrated). In step S2101, the CPU 101 determines whether all areas of the document image generated by the scanner 108 reading the document are printed on the sheet. The determination is made by comparing the size of the document image with that of the sheet used for copying, as described in FIG. 8. If the CPU 101 determines that all areas of the document image can be printed (YES in step S2101), the proceeding proceeds to step S2108 and the printer 107 executes printing. If the CPU 101 determines that a part of the area of the document image is not printed (NO in step S2101), the proceeding proceeds to step S2102.

In step S2102, the operation unit 105 displays the preview screen to notify the user where in the area of the document image is not printed. The preview screen displayed at this point displays the document image superimposed on the sheet image, as illustrated in the preview screen 900 in FIG. 9, to distinguishably display the area where the document image is not printed. Alternatively, the area where the document image is not printed on the sheet, such as the area 903 in the preview screen 900, may be highlighted.

In step S2103, the CPU 101 determines whether the document image to be subjected to the layout edit processing is selected. In the present exemplary embodiment, if the document image in the preview screen displayed in step S2102 is touched, the CPU 101 determines that the document image is selected. In step S2103, if the CPU 101 determines that the document image is selected (YES in step S2103), the proceeding proceeds to step S2104 to execute the layout edit processing to be applied to the document image. The layout edit processing applied to the document image is described below with reference to a flow chart in FIG. 22. If the CPU 101 determines that the document image is not selected (NO in step S2103), the proceeding proceeds to step S2105.

In step S2105, the CPU 101 determines whether the sheet image to be subjected to the layout edit processing is selected. In the present exemplary embodiment, if the sheet image in the preview screen displayed in step S2103 is touched, the CPU 101 determines that the sheet image is selected. In step S2105, if the CPU 101 determines that the sheet image is selected (YES in step S2105), the proceeding proceeds to step S2106 to execute the layout edit processing applied to the sheet image. The layout edit processing applied to the sheet image is described below with reference to a flow chart in FIG. 23. If the CPU 101 determines that the sheet image is not selected (NO in step S2105), the proceeding proceeds to step S2107.

In step S2107, the CPU 101 determines whether to start printing. In the present exemplary embodiment, the CPU 101 determines to start printing if an execution button (not illustrated) or the button 906 of the preview screen 900 is selected by the user. If the CPU 101 determines to start printing (YES in step S2107), the proceeding proceeds to step S2108 to execute printing. If the CPU 101 determines not to start printing (NO in step S2107), the proceeding returns to step S2103.

In the present exemplary embodiment, in step S2101 in FIG. 21, it is described that printing is executed without displaying the preview screen if all areas of the document image are printed, however, the present exemplary embodiment is not limited to the above description. Alternatively, for example, the preview screen may be displayed before the execution of printing without making the determination of step S2101 irrespective of whether all areas of the document image are printed.

Figure 22:
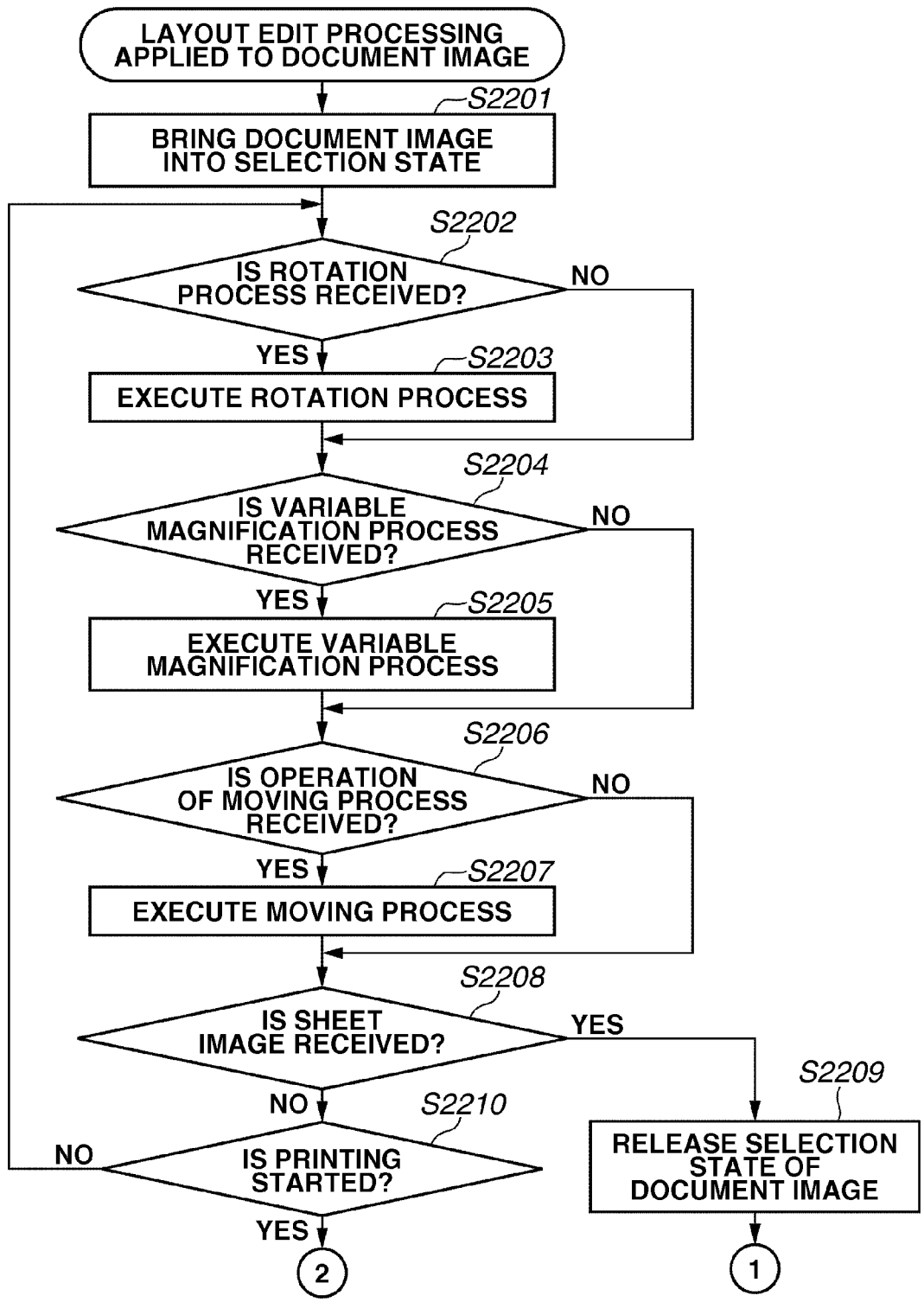
FIG. 22 is a flow chart indicating the layout edit processing applied to the document image according to the first exemplary embodiment.

The layout edit processing applied to the document image in step S2104 in FIG. 21 is described below with reference to a flow chart of FIG. 22. Steps S2201 to S2210 illustrated in FIG. 22 are processed such that the CPU 101 of the image processing apparatus 100 develops programs stored in a memory such as the ROM 102 in the RAM 103 and executes the programs.

In step S2201, the CPU 101 brings the document image into a selected state in the preview screen displayed in step S2102. In the present exemplary embodiment, the document image is highlighted to notify the user that the document image is selected as illustrated in the preview screen 1000 in FIG. 10A. In the present exemplary embodiment, when the document image is bought into the selected state, the document image can receive the layout edit processing.

In step S2202, the CPU 101 determines whether the operation of the rotation process has been received. The term "rotation process" is a process for rotating a document image as described in FIGS. 10 to 14. In the present exemplary embodiment, if the user performs operation with one finger in the area of the document image but the vertexes thereof, the CPU 101 determines to have received the operation of the rotation process.

If the CPU 101 determines to have received the operation of the rotation process (YES in step S2202), the processing proceeds to step S2203 and the CPU 101 executes the rotation process of the document image as described in FIGS. 10 to 14 based on the operation of the user. The CPU 101 executes the rotation process and then changes the print setting based on the rotation process. The CPU 101 updates the preview screen displayed on the operation unit 105 to the preview screen subjected to the rotation process and displays the updated print setting as illustrated in 1401 in FIG. 14. If the CPU 101 determines not to have received the operation of the rotation process (NO in step S2202), the processing proceeds to step S2204.

In step S2204, the CPU 101 determines whether the operation of the variable magnification process has been received. The term "variable magnification process" means a process for enlarging or reducing a document image as described in FIGS. 15 to 17. In the present exemplary embodiment, if the user performs operation at the vertex of the document image with one finger, the CPU 101 determines to have received the operation of the variable magnification process. If the CPU 101 determines to have received the operation of the variable magnification process (YES in step S2204), the processing proceeds to step S2205 and the CPU 101 executes the variable magnification process of the document image as described in FIGS. 15 to 17 based on the operation of the user.

The CPU 101 executes the variable magnification process and then changes the print setting based on the variable magnification process. The CPU 101 updates the preview screen displayed on the operation unit 105 to the preview screen subjected to the variable magnification process and displays the updated print setting as illustrated in 1701 in FIG. 17. If the CPU 101 determines not to have received the operation of the variable magnification process (NO in step S2204), the processing proceeds to step S2206.

In step S2206, the CPU 101 determines whether the operation of the moving process has been received. The term "moving process" means a process for moving the document image in any direction as described in FIGS. 18 and 19. In the present exemplary embodiment, if the user performs operation on the document image with two fingers, the CPU 101 determines to have received the operation of the moving process. If the CPU 101 determines to have received the operation of the moving process (YES in step S2206), the processing proceeds to step S2207 and the CPU 101 executes the moving process of the document image as described in FIGS. 18 and 19 based on the operation of the user. The CPU 101 executes the moving process and then changes the print setting based on the moving process. The CPU 101 updates the preview screen displayed on the operation unit 105 to be the preview screen subjected to the moving process and displays the updated print setting as illustrated in 1901 in FIG. 19. If the CPU 101 determines not to have received the operation of the moving process (NO in step S2206), the processing proceeds to step S2208.

In step S2208, the CPU 101 determines whether the sheet image is selected. If the CPU 101 determines that the sheet image is selected (YES in step S2208), the processing proceeds to step S2209 to release the selected state of the document image and proceeds to step S2105 in FIG. 21. If the CPU 101 determines that the sheet image is not selected (NO in step S2208), the processing proceeds to step S2210.

In step S2210, the CPU 101 determines whether to start printing. In the present exemplary embodiment, if an execution button (not illustrated) or the button 906 of the preview screen 900 is selected by the user, the CPU 101 determines to start printing (YES in step S2210) and proceeds to step S2108 in FIG. 21. If the CPU 101 determines not to start printing (NO in step S2210), the processing returns to step S2202.

The layout edit processing applied to the sheet image in step S2106 in FIG. 21 is described below with reference to a flow chart in FIG. 23. Steps S2301 to S2310 illustrated in FIG. 23 are processed such that the CPU 101 of the image processing apparatus 100 develops programs stored in a memory such as the ROM 102 in the RAM 103 and executes the programs.

In step S2301, the CPU 101 brings the sheet image into a selected state in the preview screen displayed in step S2102. In the present exemplary embodiment, the sheet image is highlighted to notify the user that the sheet image is selected as illustrated in the preview screen 2010 in FIG. 20B. In the present exemplary embodiment, the state where the sheet image is bought into the selected state means that the sheet image is bought into a state of receiving the layout edit processing.

In step S2302, the CPU 101 determines whether the operation of the rotation process has been received. The term "rotation process" is a process for rotating a sheet image. In the present exemplary embodiment, if the user performs operation with one finger in the area of the sheet image but the vertexes thereof, the CPU 101 determines to have received the operation of the rotation process. If the CPU 101 determines to have received the operation of the rotation process (YES in step S2302), the processing proceeds to step S2303 and the CPU 101 executes the rotation process of the sheet image based on the operation of the user. After that, the CPU 101 updates the preview screen displayed on the operation unit 105 to be the preview screen subjected to the rotation process. If the CPU 101 determines not to have received the operation of the rotation process (NO in step S2302), the processing proceeds to step S2304.

In step S2304, the CPU 101 determines whether the operation of the variable magnification process has been received. The term "variable magnification process" means a process for enlarging or reducing a sheet image. In the present exemplary embodiment, if the user performs operation at the vertex of the sheet image with one finger, the CPU 101 determines to have received the operation of the variable magnification process. If the CPU 101 determines to have received the operation of the variable magnification process (YES in step S2304), the processing proceeds to step S2305 and the CPU 101 executes the variable magnification process of the sheet image based on the operation of the user. After that, the CPU 101 updates the preview screen displayed on the operation unit 105 to be the preview screen subjected to the variable magnification process. If the CPU 101 determines not to have received the operation of the variable magnification process (NO in step S2304), the processing proceeds to step S2306.

In step S2306, the CPU 101 determines whether the operation of the moving process has been received. The term "moving process" means a process for moving the sheet image in any direction. In the present exemplary embodiment, if the user performs operation on the sheet image with two fingers, the CPU 101 determines to have received the operation of the moving process. If the CPU 101 determines to have received the operation of the moving process (YES in step S2306), the processing proceeds to step S2307 and the CPU 101 executes the moving process of the sheet image based on the operation of the user. After that, the CPU 101 updates the preview screen displayed on the operation unit 105 to be the preview screen subjected to the moving process. If the CPU 101 determines not to have received the operation of the moving process (NO in step S2306), the processing proceeds to step S2308.

In step S2308, the CPU 101 determines whether the document image is selected. If the CPU 101 determines that the document image is selected (YES in step S2308), the processing proceeds to step S2309 to release the selected state of the sheet image and proceeds to step S2103 in FIG. 21. If the CPU 101 determines that the document image is not selected (NO in step S2308), the processing proceeds to step S2310.

In step S2310, the CPU 101 determines whether to start printing. In the present exemplary embodiment, if the execution button (not illustrated) or the button 906 of the preview screen 900 is selected by the user, the CPU 101 determines to start printing (YES in step S2310) and proceeds to step S2108 in FIG. 21. If the CPU 101 determines not to start printing (NO in step S2310), the processing returns to step S2302.

As described above, in the present exemplary embodiment, by dragging the document image or the sheet image, the user can change the print setting. Therefore, the user can change the print setting by a simpler operation to obtain desired print results.

The first exemplary embodiment describes an example of processing in which a single document is copied by the scanner 108. As will be understood, a plurality of documents can also be copied. A second exemplary embodiment has a purpose to reduce time-consuming work of the user who edits layouts many times for a document with a similar size when a plurality of documents is copied.

Figure 24A:
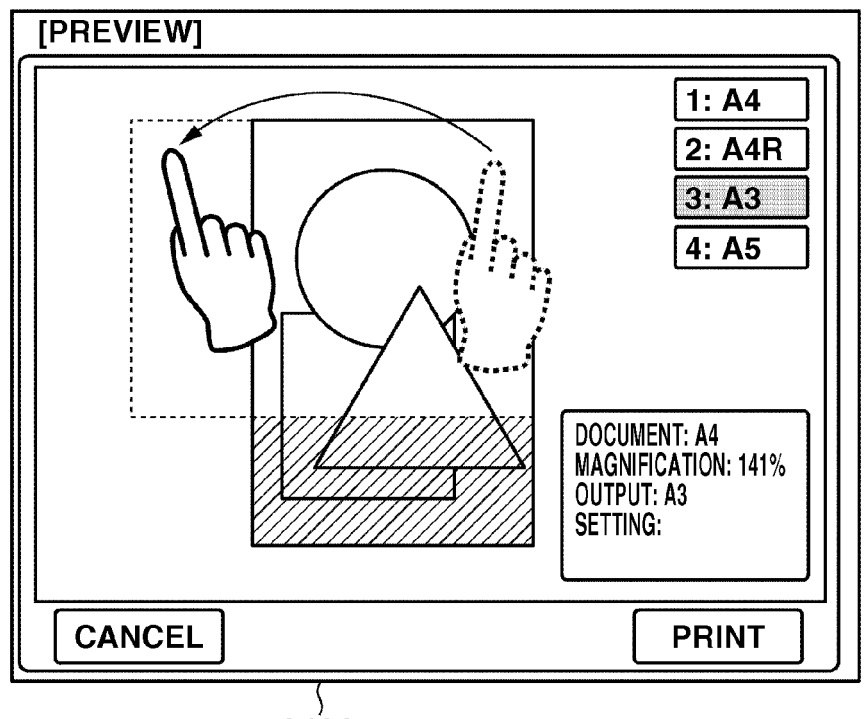
FIGS. 24A, 24B, and 24C are schematic diagrams illustrating the layout edit processing applied to documents equal in size according to a second exemplary embodiment.
Figure 24B:
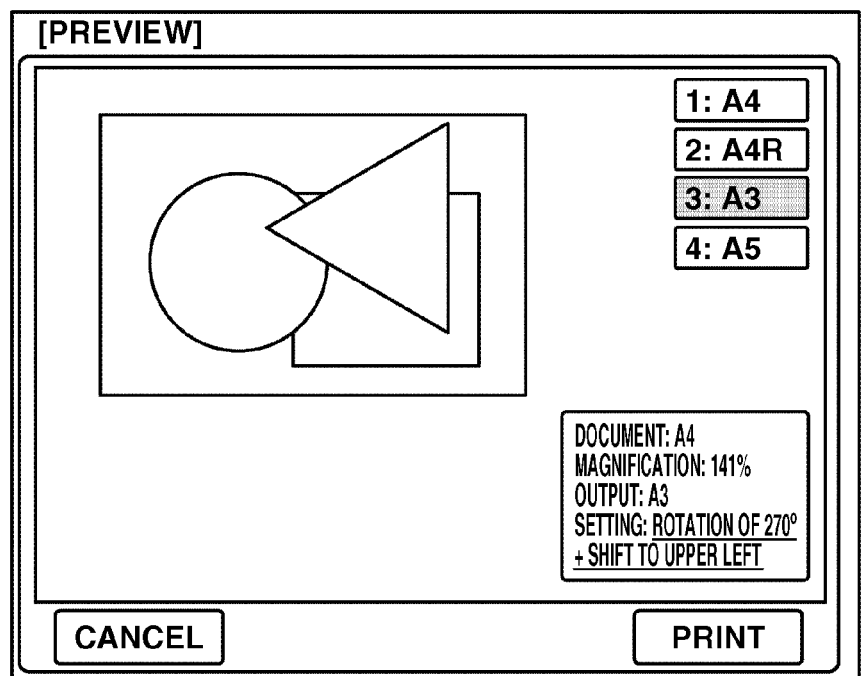
Figure 24C:
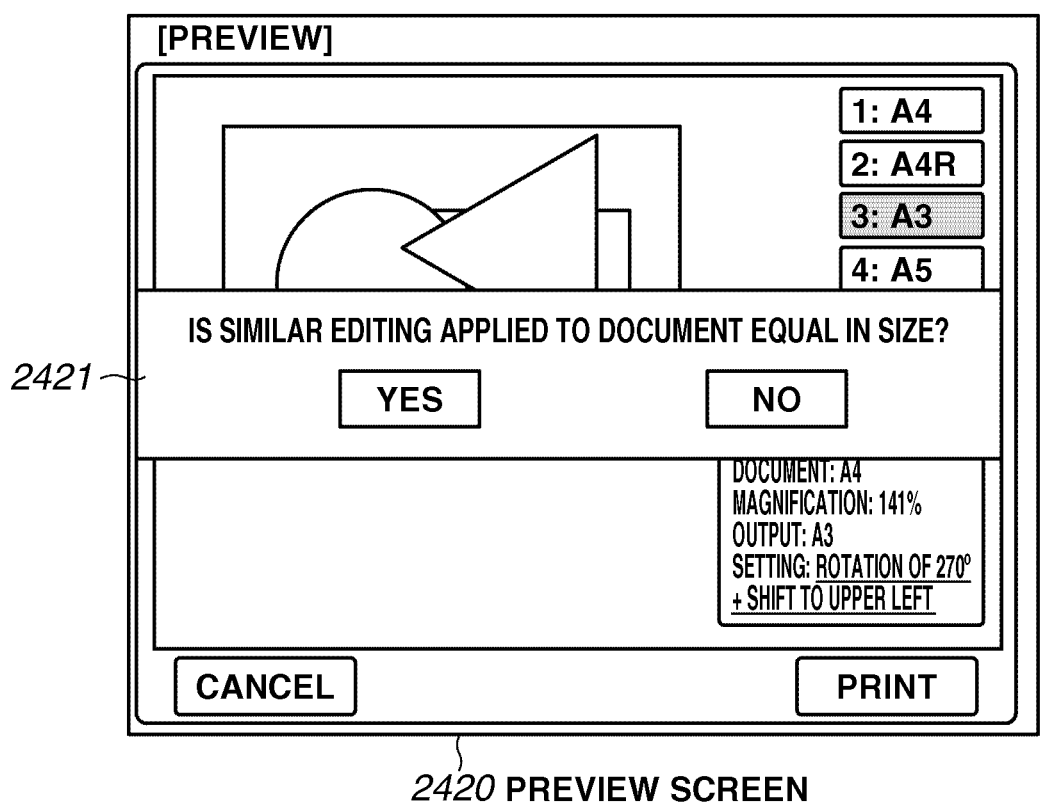

A preview screen 2400 in FIG. 24A is a screen displayed on the operation unit 105. From FIG. 24A, it can be seen that a part of the document image is not printed. When the user performs the rotation process for rotating the document image by 90° to the left on the preview screen 2400, a preview screen 2410 in FIG. 24B is displayed. The user instructs execution on the preview screen 2410 and a message 2421 appears on a preview screen 2420 in FIG. 24C, which inquires of the user whether to apply the similar editing to a document equal in size. If the user selects "Yes," the layout edited based on the operation of the user is stored. The subsequent A4-size documents are copied based on the stored layout without displaying the preview screen 2400.

Figure 25:
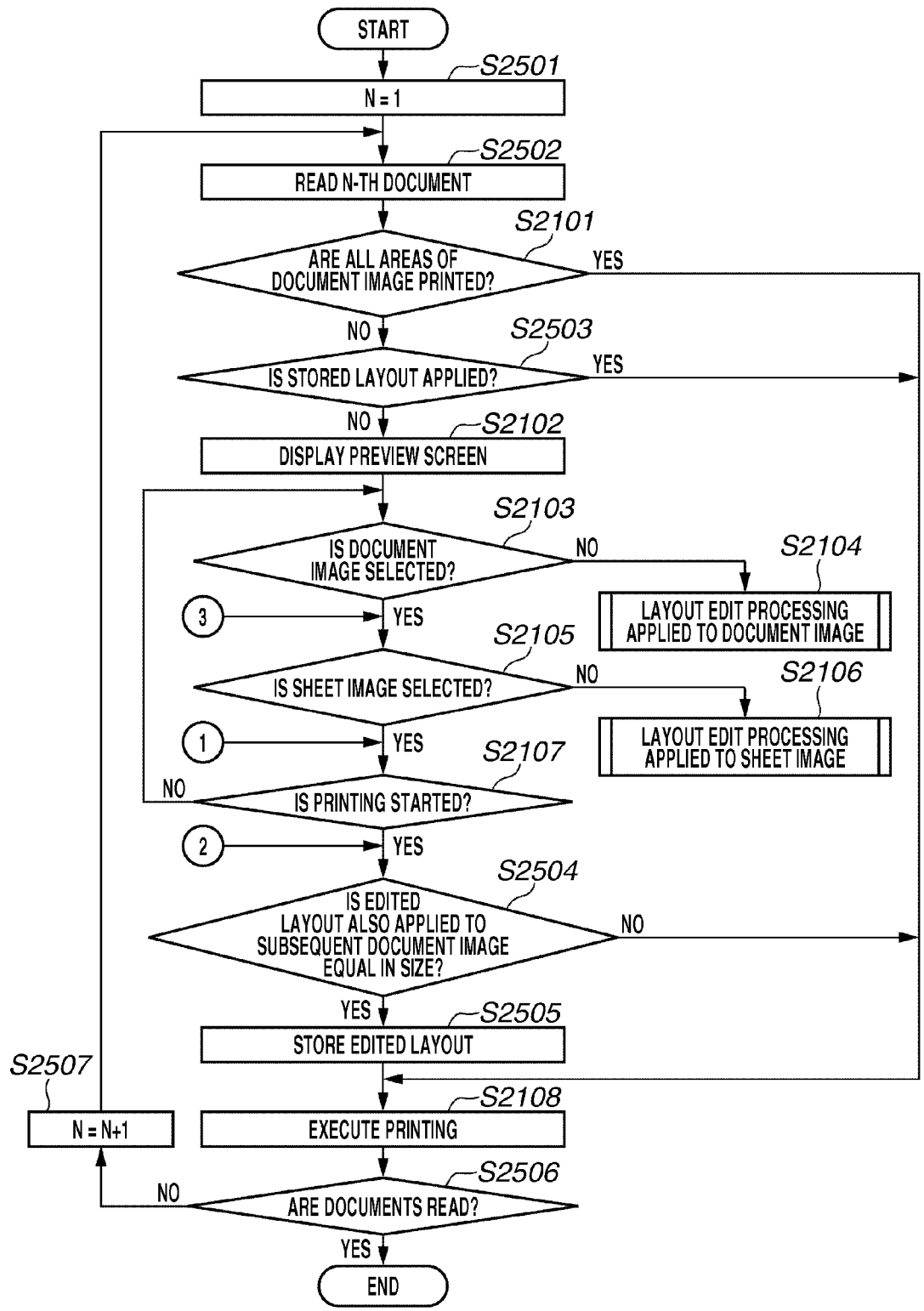
FIG. 25 is a flow chart indicating the display of the preview screen and the layout edit processing according to the second exemplary embodiment.

The display of the preview screen and the layout edit processing in the present exemplary embodiment are described below with reference to a flow chart of FIG. 25. The steps illustrated in FIG. 25 are processed such that the CPU 101 of the image processing apparatus 100 develops programs stored in a memory such as the ROM 102 in the RAM 103 and executes the programs. The steps having the same numbers as those in the flow chart in FIG. 21 perform the processes similar to those in the flow chart in FIG. 21, so that the description thereof is omitted.

In step S2501, the CPU 101 sets 1 to a variable N. In step S2502, the scanner 108 reads an N-th document. In step S2101, the CPU 101 determines whether all areas of the document image are printed.

If the CPU 101 determines that a part of the area of the document image is not printed (NO in step S2101), the processing proceeds to step S2503, and the CPU 101 determines whether to apply the stored layout. If the layout edit processing is already applied to the document image of a size similar to the N-th document image and the edited layout is stored in the image processing apparatus, in step S2503, the CPU 101 determines to apply the stored layout (YES in step S2503). If the edited layout corresponding to the size of the N-th document image is not stored in the image processing apparatus (NO in step S2503), the processing proceeds to step S2102 and the operation unit 105 displays a screen like the preview screen 2400 and urges the user to edit the layout.

When the layout edit processing is executed and printing is instructed, in step S2504, the CPU 101 determines whether the layout edited on the N-th document image is applied to subsequent document images equal in size thereto. In the present exemplary embodiment, if the user selects "Yes" on the preview screen 2420, the CPU 101 determines that the edited layout is also applied to subsequent document images equal in size (YES in step S2504), and the processing proceeds to step S2505. If the user selects "No" on the preview screen 2420, the CPU 101 determines that the edited layout is not applied to subsequent document images equal in size (NO in step S2504), and the processing proceeds to step S2108.

In step S2505, the CPU 101 stores the layout edited on the N-th document image in a memory such as the ROM 102. The stored layout is also applied to the document image similar of the size similar to the N-th document image.

In step S2108, when printing is executed, the CPU 101 determines whether the scanner 108 has read all documents. If the scanner 108 has read all documents (YES in step S2506), the processing in the flow chart is ended. If the scanner 108 has not reads all of documents (NO in step S2506), the processing proceeds to step S2507, increments the value of the variable N by 1, and returns to step S2502.

As described above, according to the present exemplary embodiment, in a case where a plurality of documents is read by the scanner 108, the edited layout can be directly applied to the document equal in size, which enables reducing time-consuming work of the user who edits layouts many times.

The layout stored in step S2505 is not always the layout corresponding to a specific size. A plurality of documents equal in size is not always set on the scanner 108, but documents having a plurality of sizes, such as A4 and A3, for example, can be set. Also in this case, the image processing apparatus according to the present exemplary embodiment can store the layouts corresponding to a plurality of sizes.

In the first and second exemplary embodiments, a case in which the document image does not agree in size with the sheet used for printing is cited as an example where a part of the area of the document image is not printed. However, even if the document image agrees in size with the sheet used for printing, sometimes a part of the area of the document image is not printed depending on the print setting. In a third exemplary embodiment, a binding margin is set as the print setting as an example where the document image agrees in size with the sheet used for printing but a part of the area of the document image is not printed.

Figure 26:
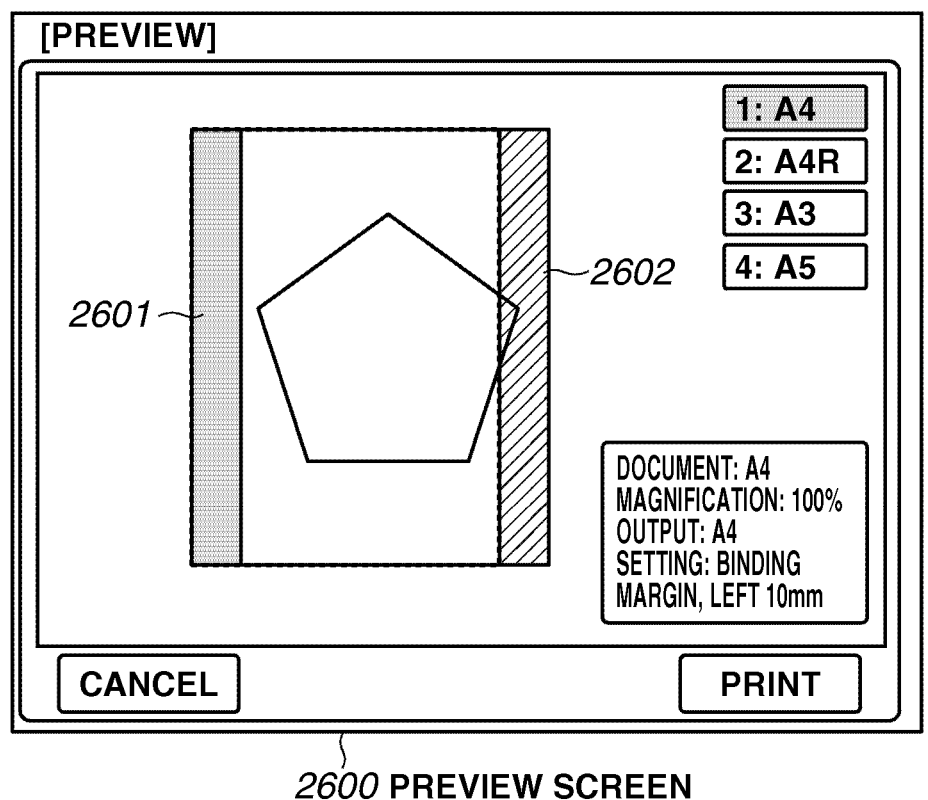
FIG. 26 is a schematic diagram illustrating the layout edit processing in a case where a binding margin is set according to a third exemplary embodiment.

It is assumed that the user places an A4-size document on the scanner 108 and sets A4 as a sheet size used for printing, 100% as a print magnification, and 10 mm as a binding margin on the left as the print setting. When the user instructs the execution of copying, the operation unit 105 displays the preview screen 2600 illustrated in FIG. 26. The preview screen 2600 displays the sheet image and the document image, as is the case with the first and second exemplary embodiments, and indicates an area for a binding margin in an area 2601, because the binding margin is set.

An area 2602 is an area where the document image is not printed on the sheet. The document image agrees in size with the sheet used for printing but the binding margin is set, so that the area 2602 is inevitably generated. According to the preview screen 2600, since a part of an image to be printed is included in the area 2602, it is desirable for the user to execute the layout edit processing.

The layout edit processing in the present exemplary embodiment is described below. The drag operation which is input by the user to perform the layout edit processing is similar to that of the first and second exemplary embodiments, so that description thereof is omitted.

Figure 27A:
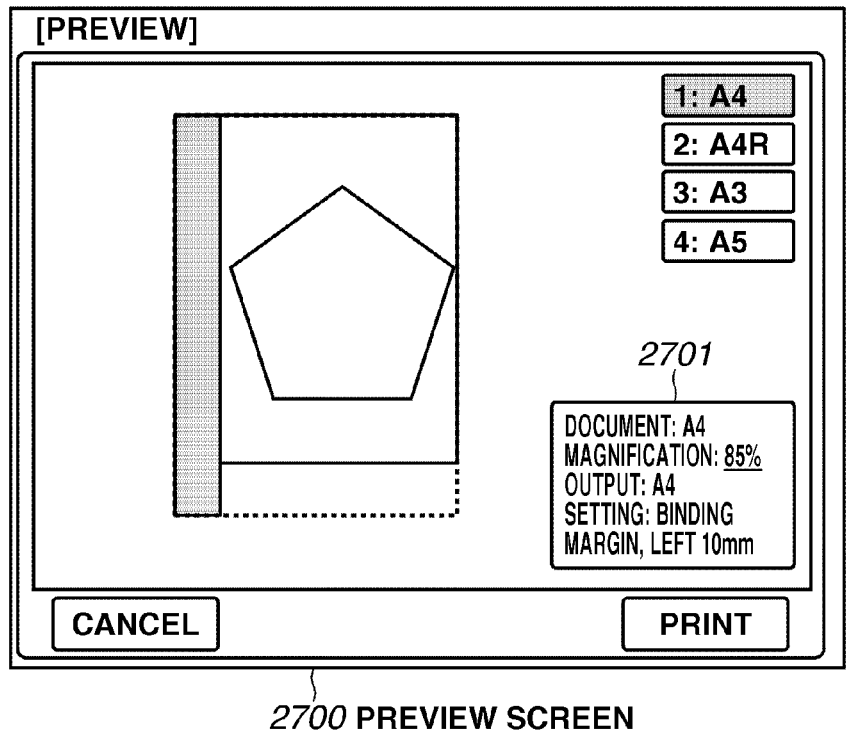
FIGS. 27A and 27B are schematic diagrams illustrating the layout edit processing in a case where a binding margin is set according to the third exemplary embodiment.

If the user performs the variable magnification process on the preview screen 2600, the layout is changed as illustrated in a preview screen 2700 in FIG. 27A. Since the user performs the variable magnification process of a magnification of 85%, all areas of the document image are included in the sheet image. A print setting 2701 in FIG. 27A is changed based on the drag operation of the user. It can be seen from the print setting 2701 that a magnification is changed to "85%."

Figure 27B:
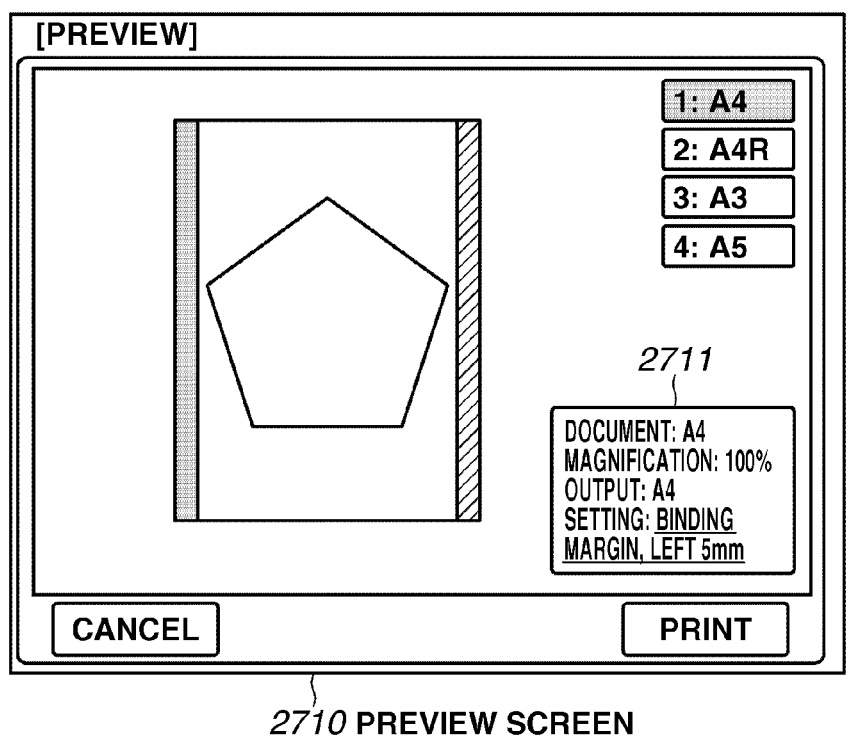

If the user performs the moving process on the preview screen 2600, the layout is changed as illustrated in a preview screen 2710 in FIG. 27B. Since the user moves the document image to the left, the image to be printed is included in the sheet image on the preview screen 2710. Furthermore, since the document image is moved to the left, the area of the binding margin is changed from 10 mm to 5 mm. A print setting 2711 in FIG. 27B is changed based on the drag operation of the user. It can be seen from the print setting 2711 that the setting of the binding margin is changed to "5 mm to the left."

As described above, according to the present exemplary embodiment, the user can execute the layout edit processing not only when the document image does not agree in size with the sheet used for printing, but also when a part of the area of the document image is not printed due to the setting of the binding margin. Furthermore, the print setting can be automatically changed according to the results of the layout edit processing.

The first to third exemplary embodiments describe a configuration in which printing is executed based on the changed print setting in a case where the user changes the print setting. However, if the print setting is changed after the scanner reads a document to generate a document image, particularly if the document image is subjected to the rotation process or the variable magnification process, the quality of the image printed on the sheet can be deteriorated. This is because the rotation or magnification of pseudo-halftone image data subjected to the screen process changes a dot pattern, which causes moiré and unevenness. A fourth exemplary embodiment has a purpose to prevent image quality from being deteriorated. According to the present embodiment, if the image quality is deteriorated by changing the print setting, the user is notified that the document should be read again by the scanner.

The display of the preview screen and the layout edit processing in the present exemplary embodiment are described below with reference to a flow chart of FIG. 28. The steps illustrated in FIG. 28 are processed such that the CPU 101 of the image processing apparatus 100 develops programs stored in a memory such as the ROM 102 in the RAM 103 and executes the programs. The steps having the same numbers as those in the flow chart in FIG. 21 perform the processes similar to those in the flow chart in FIG. 21, so that the description thereof is omitted.

In step S2801, the CPU 101 determines whether the document needs to be read again by the scanner 108. In the present exemplary embodiment, the CPU 101 determines that the document needs to be read again (YES in step S2801) in a case where the print setting is made which requires the rotation process, or the variable magnification process of the document image is performed by the user. In that case, the processing proceeds to step S2802. If the CPU 101 determines that the document does not need to be read again (NO in step S2801), the processing proceeds to step S2801 and the printer 107 executes printing based on the changed print setting.

In step S2802, the CPU 101 notifies the user that the document needs to be read again.

Figure 29:
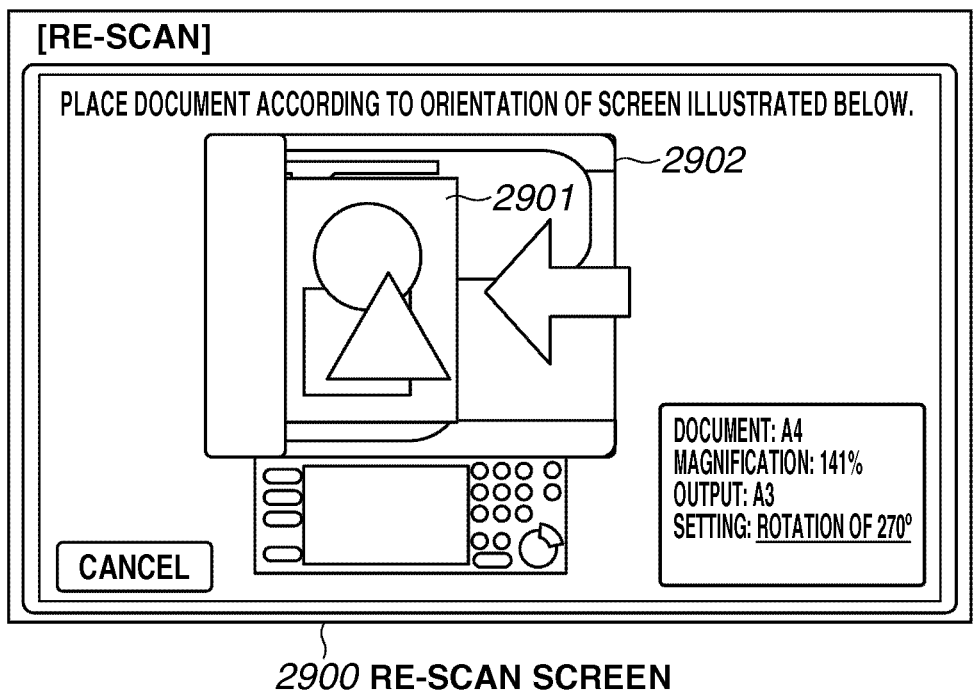
FIG. 29 is a schematic diagram illustrating a re-scan screen according to the third exemplary embodiment.

In the present exemplary embodiment, the CPU 101 causes the operation unit 105 to display a re-scan screen 2900 illustrated in FIG. 29 to notify the user that the document needs to be read again. An image 2901 illustrated in FIG. 29 indicates a document and is displayed using the document image. An image 2902 is the one indicating the scanner 108. The re-scan screen 2900 notifies the user not only of the document to be read again but also of the orientation in which the document is placed on the scanner 108 (orientation of A4-size in FIG. 29), like the image 2901. This can prevent the user from wrongly placing the document (mistaking the orientation of the document) when the user places the document on the scanner 108 to read the document again.

Now we come back to the description of the flow chart. In step S2803, the CPU 101 determines whether to start printing. If the user selects an execution button (not illustrated), the CPU 101 determines to start printing (YES in step S2803), and processing proceeds to step S2804. If the CPU 101 determines not to start printing (NO in step S2803), and processing waits until the user selects the execution button (not illustrated).

In step S2804, the scanner 108 reads the document and generates the document image based on the changed print setting. In step S2108, the printer 107 executes printing.

As described above, according to the present exemplary embodiment, if the document needs to be read again due to the change of the print setting, the screen illustrated in FIG. 29 is displayed and the user is notified that the document needs to be read again. Since the scanner 108 reads the document again and generates the document image based on the changed print setting, the quality of the image printed on the sheet can be prevented from being deteriorated.

Other Embodiments

Although the first to fourth exemplary embodiments describe the process for the case of executing copying using the scanner 108 of the image processing apparatus 100, embodiments to which the present invention can be applied are not limited to the exemplary embodiments. As another example, the present invention is also applicable to various software packages for print setting such as a printer driver installed in a PC. In this case, the size of contents (such as a sentence, figure, photograph) to be printed is compared with that of the sheet selected to be used for printing. If a part of area of the contents is not printed on the sheet, the contents superimposed on the sheet image indicating a sheet may be displayed. Furthermore, the layout edit processing described in the present invention may be executed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-278695 filed Dec. 20, 2011 and No. 2011-278696 filed Dec. 20, 2011, which are hereby incorporated by reference herein in their entirety.

What is claimed is:

1. An image processing apparatus comprising:
   a reading unit configured to read a document to generate a document image;
   a display unit adapted to superimpose said document image on a sheet image indicating a sheet used for printing, so as to distinguishably display both an area where the document image is set to be printed and an area where the document image is not set to be printed;
   a receiving unit adapted to receive a drag operation by a user on the document image displayed by the display unit;
   a changing unit configured to change a print setting for printing the document image on the sheet based on the drag operation received by the receiving unit;
   a second determination unit configured to determine whether a document is to be read again by the reading unit, if the print setting is changed by the changing unit; and
   a notification unit configured to notify a user that a document is to be read again, if the second determination unit determines that a document is to be read again.

2. The image processing apparatus according to claim 1, wherein, if the print setting is changed by the changing unit, the display unit is adapted to display the document image superimposed on the sheet image based on the changed print setting.

3. The image processing apparatus according to claim 1, wherein, if the print setting is changed by the changing unit, the display unit is adapted to display the changed print setting.

4. The image processing apparatus according to claim 1, further comprising a first determination unit configured to determine whether there is an area set not to be printed in the document image, wherein
   the image processing unit is adapted, in a case where the first determination unit determines that there is an area set not to be printed in the document image, to perform display by the display unit, and in a case where the first determination unit determines that there is no area set not to be printed in the document image, to execute printing without performing display by the display unit.

5. The image processing apparatus according to claim 1, wherein the changing unit is adapted to execute any one of a rotation process for rotating the document image, a variable magnification process for enlarging or reducing the document image, and a moving process for moving the document image, based on the drag operation received by the receiving unit.

6. The image processing apparatus according to claim 1, wherein the changing unit is adapted to execute the rotation process for rotating the document image and to align the vertex of the document image with that of the sheet image in executing the rotation process.

7. The image processing apparatus according to claim 1, further comprising a selection unit configured to select a sheet used for printing, wherein
   the sheet image displayed by the display unit corresponds to a sheet selected by the selection unit.

8. The image processing apparatus according to claim 1, wherein,
   the receiving unit is further adapted to receive a drag operation of a user on the sheet image displayed by the display unit and wherein
   the changing unit is adapted to change the size of a sheet used for printing based on the drag operation on the sheet image.

9. The image processing apparatus according to claim 1, further comprising a printing unit configured to print on the sheet based on the document image, wherein,
if the print setting is changed by the changing unit, the printing unit is adapted to print based on the changed print setting.

10. The image processing apparatus according to claim 1, wherein the second determination unit is adapted to determine that a document is to be read again by the reading unit, according to the specific processing required due to the changing unit configured to change the print setting.

11. The image processing apparatus according to claim 10, wherein the specific processing is a rotation process for rotating the document image, or a variable magnification process for enlarging or reducing the document image.

12. The image processing apparatus according to claim 1, wherein the notification unit is further adapted to notify the user of orientation in which a document is to be placed on the reading unit.

13. The image processing apparatus according to claim 12, wherein said notification is performed using an image indicating the document.

14. A method for controlling an image processing apparatus including a reading unit configured to read a document to generate a document image, the method comprising:

superimposing a said document image on a sheet image indicating a sheet used for printing, so as to distinguishably display both an area where the document image is set to be printed and an area where the document image is not set to be printed;

receiving a drag operation by a user on the document image displayed by the display unit; and changing a print setting for printing the document image on the sheet based on the drag operation determining whether a document is to be read again by the reading unit, if the print setting is changed by the changing unit, and notifying a user that a document is to be read again, if the second determination unit determines that a document is to be read again.

15. A non-transitory computer-readable storage medium for storing a program which can be read by a processor of an image processing apparatus including a reading unit configured to read a document to generate a document image, the program causing the computer to perform the method of claim 14.

* * * * *